(12) United States Patent
Yokoyama

(10) Patent No.: US 12,304,162 B2
(45) Date of Patent: *May 20, 2025

(54) METHOD FOR PRODUCING PRESS-MOLDED BODY

(71) Applicant: Teijin Limited, Osaka (JP)

(72) Inventor: Keizo Yokoyama, Osaka (JP)

(73) Assignee: Teijin Limited, Osaka (JP)

( * ) Notice: Subject to any disclaimer, the term of this patent is extended or adjusted under 35 U.S.C. 154(b) by 691 days.

This patent is subject to a terminal disclaimer.

(21) Appl. No.: 17/484,082

(22) Filed: Sep. 24, 2021

(65) Prior Publication Data

US 2022/0009179 A1 Jan. 13, 2022

Related U.S. Application Data

(63) Continuation-in-part of application No. PCT/JP2020/011603, filed on Mar. 17, 2020.

(30) Foreign Application Priority Data

Mar. 28, 2019 (JP) .................................. 2019-062691
Mar. 28, 2019 (JP) .................................. 2019-062693

(51) Int. Cl.
*B29C 70/40* (2006.01)
*B29C 70/48* (2006.01)
(Continued)

(52) U.S. Cl.
CPC ............ *B29C 70/48* (2013.01); *B29C 70/545* (2013.01); *B29K 2101/12* (2013.01); *B29K 2307/04* (2013.01); *B29K 2309/08* (2013.01)

(58) Field of Classification Search
CPC ..... B29C 45/561; B29C 70/48; B29C 70/545; B29K 2101/12; B29K 2307/04
See application file for complete search history.

(56) References Cited

U.S. PATENT DOCUMENTS 5,419,864 A  5/1995 Sheer et al.
5,688,575 A  11/1997 Sheer et al.
(Continued)

FOREIGN PATENT DOCUMENTS

CA  2027741 A1  4/1991
CN  105579211 A  5/2016
(Continued)

OTHER PUBLICATIONS

Matoba, Tetsu, Uchino, Hiroyuki, Nozawa, Tadamichi, Murata, Akihiro, et al., "Fiber-Reinforced Thermoplastics: Stampable Sheet", Nippon Steel Technical Report, No. 349, Japan, pp. 67-72.
(Continued)

*Primary Examiner* — Seyed Masoud Malekzadeh
*Assistant Examiner* — Debjani Roy
(74) *Attorney, Agent, or Firm* — Banner & Witcoff, Ltd.

(57) ABSTRACT

The present invention provides a method for producing a press-molded body, the method having: a step for placing a material X in a mold; a step for closing the mold and injecting a material Y, which is a kneaded material, into the mold after pressure has begun to be applied to part of the material X; and a step for cold-pressing the material X and the material Y in the mold to integrally mold these materials, wherein the material X is cut from a composite material M that includes reinforcing fibers FA having a weight-average fiber length $Lw_A$ and a thermoplastic resin $R_X$, the material Y includes carbon fibers B having a weight-average fiber length $Lw_B$ and a thermoplastic resin $R_Y$, $Lw_B < Lw_A$, and $Lw_A$ is 1-100 mm inclusive.

32 Claims, 12 Drawing Sheets

(51) Int. Cl.
   *B29C 70/54* (2006.01)
   *B29K 101/12* (2006.01)
   *B29K 307/04* (2006.01)
   *B29K 309/08* (2006.01)

(56) References Cited

U.S. PATENT DOCUMENTS

| | | |
|---|---|---|
| 6,617,033 B1 | 9/2003 | Straus et al. |
| 9,909,253 B2 * | 3/2018 | Sonoda ................. D21H 13/50 |
| 10,603,825 B2 | 3/2020 | Sakurai et al. |
| 2002/0039656 A1 | 4/2002 | McBain et al. |
| 2002/0171171 A1 | 11/2002 | Straus et al. |
| 2004/0071980 A1 | 4/2004 | McBain et al. |
| 2006/0065998 A1 | 3/2006 | Takigawa |
| 2014/0308519 A1 | 10/2014 | George et al. |
| 2016/0194461 A1 | 7/2016 | Suzuki et al. |
| 2016/0221274 A1 * | 8/2016 | Ono ...................... B29C 70/302 |
| 2016/0368540 A1 | 12/2016 | Terada |
| 2018/0071957 A1 | 3/2018 | Tomioka et al. |
| 2018/0222095 A1 | 8/2018 | Sakurai et al. |
| 2018/0229393 A1 * | 8/2018 | Corden ................. B29B 17/00 |
| 2019/0016016 A1 * | 1/2019 | McKay ................. B29C 70/50 |
| 2019/0016067 A1 | 1/2019 | Yokomizo et al. |
| 2020/0282670 A1 | 9/2020 | Miura et al. |
| 2022/0009179 A1 * | 1/2022 | Yokoyama ............ B29C 70/545 |

FOREIGN PATENT DOCUMENTS

| | | | |
|---|---|---|---|
| DE | 4443145 | C1 | 3/1996 |
| EP | 1273418 | A2 | 1/2003 |
| EP | 3132904 | A1 | 2/2017 |
| EP | 3395529 | A1 | 10/2018 |
| FR | 1120570 | A | 7/1956 |
| GB | 2453339 | A | 4/2009 |
| GB | D0-0719232 | A | 4/2009 |
| JP | H07-138837 | A | 5/1995 |
| JP | H08-192439 | A | 7/1996 |
| JP | 2000043077 | A | 2/2000 |
| JP | 2000-094469 | A | 4/2000 |
| JP | 2000-185355 | A | 7/2000 |
| JP | 12003-170470 | A | 6/2003 |
| JP | 2004-502570 | A | 1/2004 |
| JP | 2007-076081 | A | 3/2007 |
| JP | 2010-253938 | A | 11/2010 |
| JP | 2010-269530 | A | 12/2010 |
| JP | 2012-071595 | A | 4/2012 |
| JP | 2012-106490 | A | 6/2012 |
| JP | 2012-232506 | A | 11/2012 |
| JP | 2012-240276 | A | 12/2012 |
| JP | 2013-075447 | A | 4/2013 |
| JP | 2017-177692 | A | 10/2017 |
| JP | 2017-213902 | A | 12/2017 |
| JP | 2018-192730 | A | 6/2018 |
| JP | 2018-122573 | A | 8/2018 |
| JP | 2018-171714 | A | 11/2018 |
| JP | 2018192730 | * | 12/2018 |
| MX | 9202238 | A | 11/1992 |
| WO | 2016-104416 | A1 | 6/2016 |
| WO | 2016-167349 | A1 | 10/2016 |
| WO | WO-2017119465 A1 * | 7/2017 | ........... B29C 43/021 |

OTHER PUBLICATIONS

Jun. 9, 2020—International Search Report—Intl App PCT/JP2020/011603.

Jun. 9, 2020—International Search Report—Intl App PCT/JP2020/011604.

Sep. 24, 20214—(US) Co-pending U.S. Appl. No. 17/484,190.

* cited by examiner

FIG.14
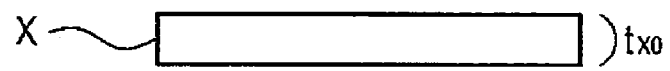
FIG.15
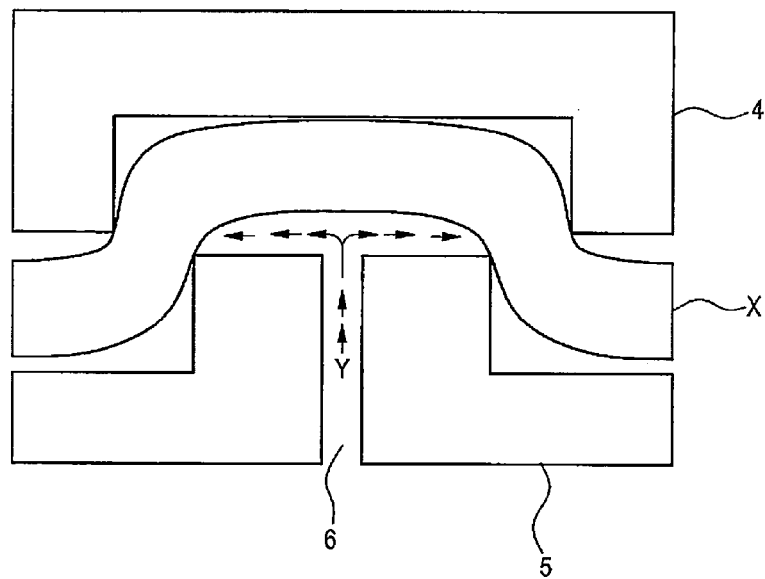

METHOD FOR PRODUCING PRESS-MOLDED BODY

CROSS REFERENCE TO RELATED APPLICATION

This is a continuation-in-part application of International Application No. PCT/JP2020/011603 filed on Mar. 17, 2020, and claims priorities from Japanese Patent Application No. 2019-062691 filed on Mar. 28, 2019 and Japanese Patent Application No. 2019-062693 filed on Mar. 28, 2019.

TECHNICAL FIELD

The present invention relates to a method of manufacturing a press-molded body.

BACKGROUND ART

A composite material using a reinforcing fiber as a reinforcing material has a high tensile strength and tensile elastic modulus and has a small linear expansion coefficient, so that the composite material is excellent in dimensional stability, and is also excellent in heat resistance, chemical resistance, fatigue resistance, wear resistance, abrasion resistance, electromagnetic wave shielding property, and X-ray permeability, so that the composite material using the reinforcing fiber as the reinforcing material is widely applied to automobiles, sports and leisure, aerospace, general industrial applications, and the like.

In particular, a composite material (composite material of thermoplastic resin and reinforcing fiber) containing a reinforcing fiber and a thermoplastic resin has excellent mechanical properties because the reinforcing fiber is present in a thermoplastic matrix resin, and attracts attention for an application to structural members of automobiles and the like.

For example, Patent Literature 1 discloses a method of manufacturing an integrated molded product, in which a preform is prepared by stacking substrates having a discontinuous reinforcing fiber, the preform is press-molded to obtain a planar molded body, the planar molded body is inserted into a mold for injection molding, and then a thermoplastic resin is injection-molded to be integrated.

Patent Literature 2 discloses a method of manufacturing a fiber-reinforced composite material molded product in which a resin composition containing a thermoplastic resin and a reinforcing fiber having a fiber length of 0.02 mm or more and less than 3 mm is injected while a fiber-reinforced resin substrate containing a thermoplastic resin and a reinforcing fiber having a fiber length of 3 mm or more and less than 100 mm is being shaped by a mold.

Patent Literature 3 discloses a fiber-reinforced resin molded product molded into a three-dimensional shape based on a sheet-shaped substrate containing a fiber-reinforced resin, in which a thick portion is formed by injection molding at a corner portion formed by connecting plate portions in three or more directions which are different from each other.

Patent Literature 4 discloses an invention for manufacturing a molded body by, when molding a sheet molding compound (hereinafter referred to as SMC) containing a thermosetting resin, cutting out a material for molding from the SMC and then simultaneously pressing a remaining offcut.

CITATION LIST

Patent Literature

Patent Literature 1: JP-A-2010-253938
Patent Literature 2: WO 2016/167349
Patent Literature 3: JP-A-2018-122573
Patent Literature 4: specification of US Patent Application Publication No. 2019/0016016

SUMMARY OF INVENTION

Technical Problem

However, in the invention disclosed in Patent Literature 1, in order to manufacture the integrated molded product, it is necessary to perform two molding steps of press molding and injection molding, and productivity is poor.

Patent Literatures 2 and 3 disclose a method of manufacturing a molded body by injecting another thermoplastic resin during press processing of a sheet-shaped fiber-reinforced resin substrate, but reduction of loss of a composite material containing a reinforcing fiber and a thermoplastic resin, which is a raw material to be described later, has not been studied.

Although press molding using the SMC containing the thermosetting resin is disclosed in Patent Literature 4, a problem that occurs when a composite material containing a thermoplastic resin is pattern-cut and press-molded is not recognized.

That is, in the case of manufacturing a press-molded body (in particular, a molded body having a complicated shape) from a sheet-shaped molding material, the molding material for press molding may be cut out by pattern-cutting from a composite material containing a reinforcing fiber and a thermoplastic resin. In this pattern cutting, offcuts (a part of the raw material other than the molding material cut out for the press molding) are usually generated. In particular, as a shape of the molded body to be manufactured is complicated, an amount of the offcuts generated tends to increase (that is, the number of molding materials which can be cut out from one composite material tends to decrease), and loss of the composite material occurs.

In Patent Literatures 1 to 4, this problem has not been studied at all.

Accordingly, an object of the present invention is to provide a method of manufacturing a press-molded body, which can reduce loss of a composite material containing a reinforcing fiber and a thermoplastic resin, which is a raw material, and increase the number of molding materials which can be cut out from one composite material, when a press-molded body is manufactured from a molding material containing a reinforcing fiber and a thermoplastic resin.

Hereinafter, a springback, which is a further subject of the present invention, will be described.

That is, in Patent Literatures 2 and 3, a problem that a fiber-reinforced resin substrate springback is not recognized, and a method for solving this problem has not been studied. When the sheet-shaped molding material containing the reinforcing fiber and the thermoplastic resin is heated during the press molding, a thickness may increase as compared with that before heating (this phenomenon is called as "springback").

Therefore, a following problem is present as a next problem: when a molding material for the injection molding (Y material to be described later in the present invention) is injected while a sheet-shaped molding material (X material to be described later in the present invention) is being pressed to manufacture a molded body having a top plane portion and a standing plane portion is manufactured, the injected Y material is difficult to pass through from a cavity region (for example, a cavity region for forming the top plane portion) other than a cavity region for forming the standing plane portion to the cavity region for forming the standing plane portion even if the injected Y material is caused to flow, since a thickness of the X material is increased by the springback, particularly in a bent region from the top plane portion to the standing plane portion.

In Patent Literatures 1 to 4, this problem has not been studied at all.

Accordingly, a further object of the present invention is to provide a method of manufacturing a press-molded body in which, when a press-molded body having a top plane portion and a standing plane portion is manufactured from a molding material containing a reinforcing fiber and a thermoplastic resin, an injection molding material can be caused to flow from a cavity region other than a cavity region for forming the standing plane portion to a cavity region for forming the standing plane portion.

Solution to Problem

In order to solve the above problems, the present invention provides the following solutions.

[1]

A method of manufacturing a press-molded body including:
  a step of placing an X material in a mold;
  a step of closing the mold, starting applying pressure to a part of the X material, and then injecting a Y material, which is a kneaded material, into the mold; and
  a step of cold pressing the X material and the Y material in the mold to integrally mold the X material and the Y material, in which
  the X material is cut out from a composite material M containing a reinforcing fiber FA having a weight average fiber length $Lw_A$ and a thermoplastic resin $R_X$,
  the Y material contains a reinforcing fiber FB having a weight average fiber length $Lw_B$ and a thermoplastic resin $R_Y$, in which
$Lw_B < Lw_A$, and
$Lw_A$ is 1 mm or more and 100 mm or less,
  wherein the reinforcing fiber FA is a carbon fiber A having a weight average fiber length $Lw_A$ or a glass fiber GA having a weight average fiber length $Lw_A$, and the reinforcing fiber FB is a carbon fiber B having a weight average fiber length $Lw_B$ or a glass fiber GB having a weight average fiber length $Lw_B$.

[2]

The method of manufacturing a press-molded body according to [1], in which the Y material is obtained by using an offcut as a raw material, the offcut remained after cutting out the X material from the composite material M.

[3]

The method of manufacturing a press-molded body according to [1] or [2], in which the X material is cut out by pattern-cutting from the composite material M.

[4]

The method of manufacturing a press-molded body according to any one of [1] to [3], in which
  a ratio $Q_X:Q_Y$ of a total weight $Q_X$ of the X material to be used to a total weight $Q_Y$ of the Y material to be used is 99:1 to 50:50, and
  a proportion of a Y region made of the Y material increases toward at least one end portion in an in-plane direction of the press-molded body.

[5]

The method of manufacturing a press-molded body according to [4], in which the at least one end portion in the in-plane direction of the press-molded body is formed of only the Y region made of the Y material.

[6]

The method of manufacturing a press-molded body according to [5], in which
  the press-molded body has a transition section XY in which an X region made of the X material and a Y region made of the Y material are stacked, and
  the end portion in the in-plane direction formed of only the Y region is continuously formed with the Y region of the transition section XY.

[7]

The method of manufacturing a press-molded body according to any one of [1] to [6], in which a volume $V_X$ of the X material to be used and a volume $V_Y$ of the Y material to be used satisfy a relationship of $V_X \geq V_Y$.

[8]

The method of manufacturing a press-molded body according to any one of [1] to [7], in which the weight average fiber length $Lw_B$ is 1.0 mm or less.

[9]

The method of manufacturing a press-molded body according to any one of [1] to [8], in which a shape of the X material is a shape developed by an inverse molding analysis in a computer from a three-dimensional shape of the press-molded body.

[10]

The method of manufacturing a press-molded body according to any one of [1] to [9], in which the press-molded body has a flange portion, and at least one end portion of the flange portion is formed of only the Y region made of the Y material.

[11]

The method of manufacturing a press-molded body according to any one of [1] to [10], in which the press-molded body includes a portion having a hat-shaped cross section.

[12]

The method of manufacturing a press-molded body according to any one of [1] to [11], in which a relationship between a fiber volume fraction $Vf_X$ of the X material and a fiber volume fraction $Vf_Y$ of the Y material satisfy $Vf_X \geq Vf_Y$.

[13]

The method of manufacturing a press-molded body according to any one of [1] to [12], in which the X material has a plate shape, and the Y material flows and extends in an in-plane direction of the X material to manufacture the press-molded body.

[14]

The method of manufacturing a press-molded body according to any one of [1] to [13], in which the Y material is obtained by crushing an offcut as a raw material, the offcut remained after cutting out the X material from the composite material.

[15]

The method of manufacturing a press-molded body according to any one of [1] to [14], in which the press-molded body has a flange portion, and at least one end portion of the flange portion is formed of only the Y region made of the Y material.

[16]
The method of manufacturing a press-molded body according to any one of [1] to [15], in which
a springback amount of the X material is more than 1.0 and less than 14.0,
the press-molded body has a standing plane portion and a top plane portion,
a thickness t1 of the standing plane portion and a thickness t2 of the top plane portion satisfy t1>t2, and
in the cold pressing, the Y material is caused to flow from a cavity region other than a cavity region for forming the standing plane portion to a cavity region for forming the standing plane portion and press-molded.

[17]
The method of manufacturing a press-molded body according to [16], in which the mold has a cavity in which a thickness T1 of a cavity region for forming the standing plane portion and a thickness T2 of a cavity region for forming the top plane portion are T1>T2.

[18]
The method of manufacturing a press-molded body according to [17], in which the thickness T1 of the cavity region for forming the standing plane portion and a plate thickness $tx_1$ of X material with springback satisfy $T1>T_{x1}$.

[19]
A method of manufacturing a press-molded body including:
a step of placing an X material in a mold;
a step of closing the mold, starting applying pressure to a part of the X material, and then injecting a Y material, which is a kneaded material, into the mold: and
a step of cold pressing the X material and the Y material in the mold to integrally mold the X material and the Y material, in which
the X material is cut out from a composite material M containing a carbon fiber A having a weight average fiber length $Lw_A$ and a thermoplastic resin $R_X$,
the Y material contains a carbon fiber B having a weight average fiber length $Lw_B$ and a thermoplastic resin $R_Y$, in which
$Lw_B<Lw_A$, and
$Lw_A$ is 1 mm or more and 100 mm or less.

[20]
The method of manufacturing a press-molded body according to [19], in which the Y material is obtained by using an offcut as a raw material, the offcut remained after cutting out the X material from the composite material M.

[21]
The method of manufacturing a press-molded body according to [19] or [20], in which the X material is cut out by pattern-cutting from the composite material M.

[22]
The method of manufacturing a press-molded body according to any one of [19] to [21], in which
a ratio $Q_X:Q_Y$ of a total weight $Q_X$ of the X material to be used to a total weight $Q_Y$ of the Y material to be used is 99:1 to 50:50, and
a proportion of a Y region made of the Y material increases toward at least one end portion in an in-plane direction of the press-molded body.

[23]
The method of manufacturing a press-molded body according to [22], in which the at least one end portion in the in-plane direction of the press-molded body is formed of only the Y region made of the Y material.

[24]
The method of manufacturing a press-molded body according to [23], in which
the press-molded body has a transition section XY in which an X region made of the X material and a Y region made of the Y material are stacked, and
the end portion in the in-plane direction formed of only the Y region is continuously formed with the Y region of the transition section XY.

[25]
The method of manufacturing a press-molded body according to any one of [19] to [24], in which a volume $V_X$ of the X material to be used and a volume $V_Y$ of the Y material to be used satisfy a relationship of $V_X \geq V_Y$.

[26]
The method of manufacturing a press-molded body according to any one of [19] to [25], in which the weight average fiber length $Lw_B$ is 1.0 mm or less.

[27]
The method of manufacturing a press-molded body according to any one of [19] to [26], in which a shape of the X material is a shape developed by an inverse molding analysis in a computer from a three-dimensional shape of the press-molded body.

[28]
The method of manufacturing a press-molded body according to any one of [19] to [27], in which the press-molded body has a flange portion, and at least one end portion of the flange portion is formed of only the Y region made of the Y material.

[29]
The method of manufacturing a press-molded body according to any one of [19] to [28], in which the press-molded body includes a portion having a hat-shaped cross section.

[30]
The method of manufacturing a press-molded body according to any one of [19] to [29], in which a relationship between a fiber volume fraction $Vf_X$ of the X material and a fiber volume fraction $Vf_Y$ of the Y material satisfy $Vf_X \geq Vf_Y$.

[31]
The method of manufacturing a press-molded body according to any one of [19] to [30], in which the X material has a plate shape, and the Y material flows and extends in an in-plane direction of the X material to manufacture the press-molded body.

[32]
The method of manufacturing a press-molded body according to any one of [19] to [31], in which the Y material is obtained by crushing an offcut as a raw material, the offcut remained after cutting out the X material from the composite material.

[33]
The method of manufacturing a press-molded body according to any one of [19] to [32], in which the press-molded body has a flange portion, and at least one end portion of the flange portion is formed of only the Y region made of the Y material.

[34]
The method of manufacturing a press-molded body according to any one of [19] to [33], in which
a springback amount of the X material is more than 1.0 and less than 14.0,
the press-molded body has a standing plane portion and a top plane portion,
a thickness t1 of the standing plane portion and a thickness t2 of the top plane portion satisfy t1>t2, and in the cold pressing, the Y material is caused to flow from a cavity region other than a cavity region for forming the standing plane portion to a cavity region for forming the standing plane portion and press-molded.

[35]

The method of manufacturing a press-molded body according to [34], in which the mold has a cavity in which a thickness T1 of a cavity region for forming the standing plane portion and a thickness T2 of a cavity region for forming the top plane portion are T1>T2.

[36]

The method of manufacturing a press-molded body according to [35], in which the thickness T1 of the cavity region for forming the standing plane portion and a plate thickness $tx_1$ of X material with springback satisfy $T1>T_{x1}$.

Advantageous Effects of Invention

According to the method of manufacturing a press-molded body of the present invention, when the press-molded body is manufactured from the molding material containing the reinforcing fiber and the thermoplastic resin, the loss of the composite material containing the reinforcing fiber and the thermoplastic resin, which is the raw material, can be reduced, and the number of molding materials that can be cut out from one composite material can be increased.

As a further effect of the present invention, it is possible to provide the method of manufacturing a press-molded body in which, when the press-molded body having the top plane portion and the standing plane portion is manufactured from the molding material containing the reinforcing fiber and the thermoplastic resin, the injection molding material can be caused to flow from the cavity region other than the cavity region for forming the standing plane portion to the cavity region for forming the standing plane portion.

BRIEF DESCRIPTION OF DRAWINGS

FIG. 14 is a schematic cross-sectional view showing an example of an X material before heating and a heated X material with springback.

FIG. 15 is a schematic cross-sectional view showing a state in which the X material with springback blocked the advance of the Y material charged into a cavity region for forming a top plane portion into a cavity region for forming a standing plane portion.

DESCRIPTION OF EMBODIMENTS

Figure 1A:
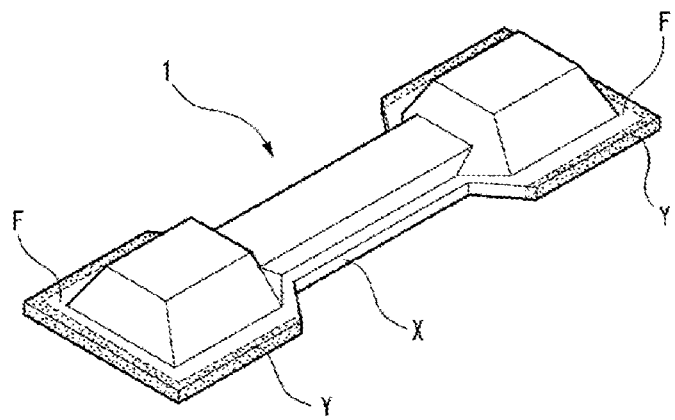
FIG. 1A is a perspective view showing an example of a press-molded body.

Hereinafter, the present invention will be described in detail.

In the present disclosure, a term "reinforcing fiber" refers to "carbon fiber" or "glass fiber". For example, "a composite material of thermoplastic resin and reinforcing fiber" refers to "a composite material of thermoplastic resin and carbon fiber" or "a composite material of thermoplastic resin and glass fiber". Hereinafter, the "composite material of thermoplastic resin and reinforcing fiber" may be referred to as a "thermoplastic reinforcing fiber composite material".

(1) In case using carbon fiber as reinforcing fiber, the terms "reinforcing fiber", "reinforcing fiber FA", and "reinforcing fiber FB" in the following disclosure should be read as "carbon fiber", "carbon fiber A", and "carbon fiber B", respectively.

(2) In case using glass fiber as reinforcing fiber, the terms "reinforcing fiber", "reinforcing fiber FA", and "reinforcing fiber FB" in the following disclosure should be read as "glass fiber", "glass fiber GA", and "glass fiber GB", respectively.

(3) In case both carbon fiber and glass fiber are used as reinforcing fiber, the term "reinforcing fiber FA" and "reinforcing fiber FB" in the following disclosure should be read as "a combination of carbon fiber A and glass fiber GB" or "a combination of glass fiber GA and carbon fiber B".

Even when the above terms of (1) to (3) are replaced, another reinforcing fiber may be added as other optional components appropriately.

[Overview: Invention in General]

A method of manufacturing a press-molded body includes:

a step of placing an X material in a mold;

a step of closing the mold, starting applying pressure to a part of the X material, and then injecting a Y material, which is a kneaded material, into the mold; and a step of cold pressing the X material and the Y material in the mold to integrally mold the X material and the Y material, in which the X material is cut out from a composite material M containing a reinforcing fiber FA having a weight average fiber length $Lw_A$ and a thermoplastic resin $R_X$, the Y material contains a reinforcing fiber FB having a weight average fiber length $Lw_B$ and a thermoplastic resin $R_Y$, in which $Lw_B < Lw_A$, and $Lw_A$ is 1 mm or more and 100 mm or less, wherein the reinforcing fiber FA is a carbon fiber A having a weight average fiber length $Lw_A$ or a glass fiber GA having a weight average fiber length $Lw_A$, and the reinforcing fiber FB is a carbon fiber B having a weight average fiber length $Lw_B$ or a glass fiber GB having a weight average fiber length $Lw_B$.

In case using carbon fiber, a preferred method of manufacturing a press-molded body of the present invention includes:

a step of placing an X material in a mold;

a step of closing the mold, starting applying pressure to a part of the X material, and then injecting a Y material, which is a kneaded material, into the mold; and a step of cold pressing the X material and the Y material in the mold to integrally mold the X material and the Y material, in which the X material is cut out from a composite material M containing a carbon fiber A having a weight average fiber length $Lw_A$ and a thermoplastic resin $R_X$, and the Y material contains a carbon fiber B having a weight average fiber length $Lw_B$ and a thermoplastic resin $R_Y$, in which $Lw_B < Lw_A$, and $Lw_A$ is 1 mm or more and 100 mm or less.

In case using glass fiber, a method of manufacturing a press-molded body of the present invention may include:

a step of placing an X material in a mold;

a step of closing the mold, starting applying pressure to a part of the X material, and then injecting a Y material, which is a kneaded material, into the mold; and a step of cold pressing the X material and the Y material in the mold to integrally mold the X material and the Y material, in which the X material is cut out from a composite material M containing a glass fiber GA having a weight average fiber length $Lw_A$ and a thermoplastic resin $R_X$, and the Y material contains a glass fiber GB having a weight average fiber length $Lw_B$ and a thermoplastic resin $R_Y$, in which $Lw_B < Lw_A$, and $Lw_A$ is 1 mm or more and 100 mm or less.

As described above, the method of manufacturing a press-molded body of the present invention uses at least the X material and the Y material containing the reinforcing fiber having different weight average fiber lengths and the thermoplastic resin, and includes: placing the X material (typically a plate-shaped material) in the mold: closing the mold, starting applying pressure to at least a part of the X material, and then injecting the Y material, which is the kneaded material, into the mold (typically charged by an injection device): and cold pressing the X material and the Y material in the mold to manufacture the press-molded body (also referred to simply as a "molded body").

According to the method of manufacturing a press-molded body of the present invention, when the press-molded body having a complicated shape is manufactured from a molding material containing a reinforcing fiber and a thermoplastic resin, loss of a composite material containing a reinforcing fiber and a thermoplastic resin, which is a raw material, can be reduced, and the number of molding materials that can be cut out from one composite material can be increased. Reasons will be described below.

In general, press molding is a molding method in which a plate-shaped molding material is heated, and the heated molding material is sandwiched between molds and pressed to obtain a molded body having a desired shape. When the molding material is made of only a thermoplastic resin, the molding material easily flows during the press molding, so that a molded body having a complicated shape can be easily manufactured. However, in the case where the molding material is a thermoplastic reinforcing fiber composite material, the longer a fiber length of the reinforcing fiber, the harder it is to flow. For example, when an orientation direction of the reinforcing fiber in the thermoplastic reinforcing fiber composite material is adjusted for the purpose of improving a property of the press-molded body, when the flow is excessive, the orientation direction of the reinforcing fiber is disturbed, and there may be a problem that the purpose of improving the property of the obtained press-molded body cannot be sufficiently achieved.

Therefore, it is preferable that the thermoplastic reinforcing fiber composite material to be subjected to the press molding is cut into a pattern shape (also referred to as "pattern-cut") when being cut out from a raw material substrate (the composite material M containing the reinforcing fiber and the thermoplastic resin) so that a press-molded body having a desired shape can be obtained without much flow.

A pattern cut shape (a shape of the X material) is preferably a shape developed by an inverse molding analysis in a computer from a three-dimensional shape of the press-molded body to be manufactured.

However, when the thermoplastic reinforcing fiber composite material to be subjected to the press molding is cut out from the raw material substrate, an offcut (a portion other than the thermoplastic reinforcing fiber composite material cut out to be subjected to the press molding in the raw material substrate) is remained. Present inventors focus on a fact that the occurrence of this offcut causes loss of the composite material M, which causes a decrease in production efficiency in a manufacturing process of the press-molded body.

Therefore, the present inventors intensively study, and it is considered that the production efficiency can be increased if an amount of the occurred offcuts can be reduced (increasing the number of thermoplastic reinforcing fiber composite materials cut out from one raw material substrate). The above "increasing the number of thermoplastic reinforcing fiber composite materials cut out from one raw material substrate" includes not only increasing the number of thermoplastic reinforcing fiber composite materials having a single type of shape cutting out, but also increasing a total number of thermoplastic reinforcing fiber composite materials having two or more different types of shape cutting out.

Then, by examining how to cut the thermoplastic reinforcing fiber composite material (X material in the present invention) from the raw material substrate, it became possible to increase the production efficiency.

Figure 1B:
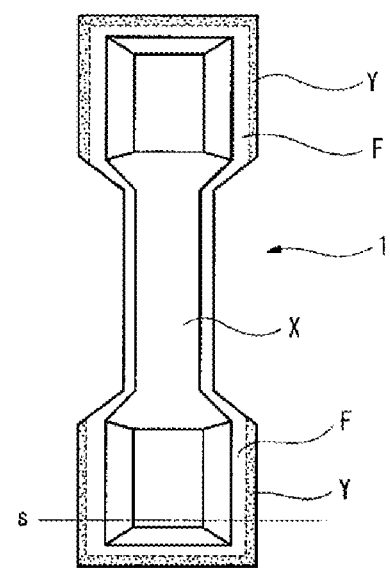
FIG. 1B is a plan view showing an example of a press-molded body.
Figure 1C:
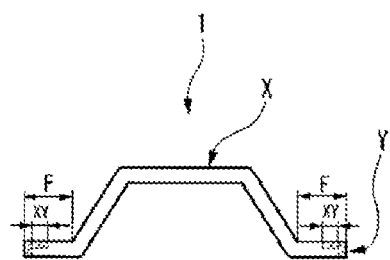
FIG. 1C is a cross-sectional view taken along a dashed-dotted line s in FIG. 1B.
Figure 2:
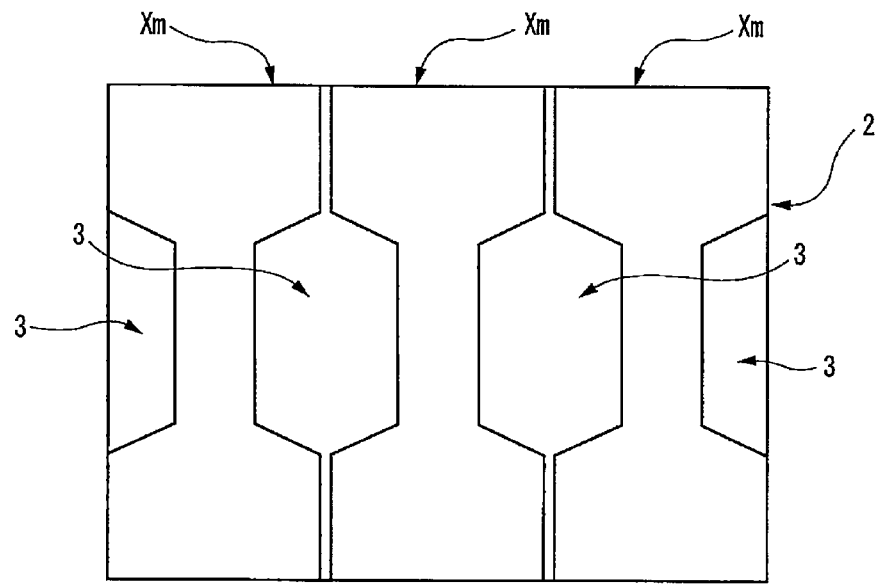
FIG. 2 is a schematic view showing how an X material is cut out from a raw material substrate (composite material M).

For example, when a press-molded body including a portion having a hat-shaped cross section shown in FIGS. 1A to 1C is manufactured, it is preferable to cut the thermoplastic reinforcing fiber composite material into a shape shown in FIG. 2. Reference sign 2 in FIG. 2 denotes the raw material substrate. In this case, when being pattern-cut into the shape shown in FIG. 2, a large amount of the offcuts (reference sign 3 in FIG. 2) occurs.

Figure 3:
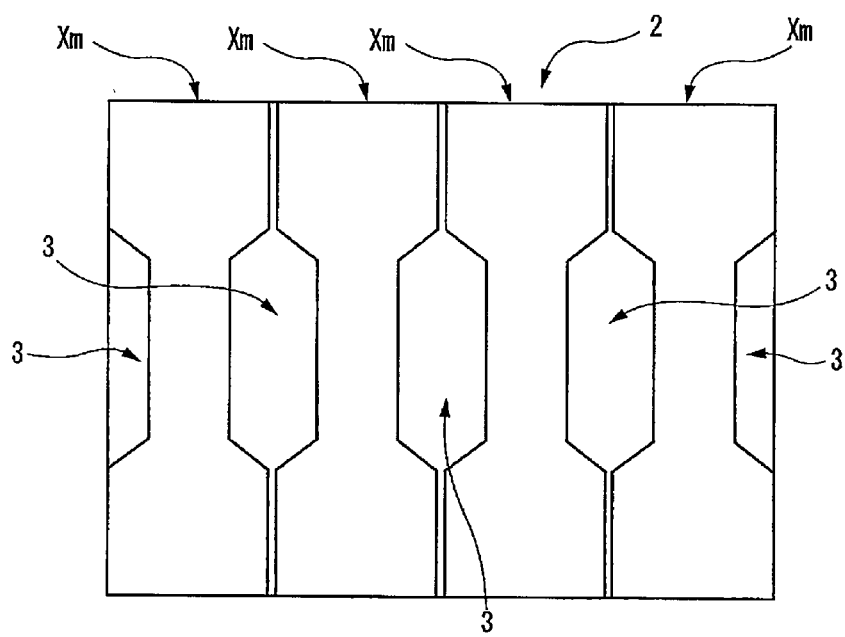
FIG. 3 is a schematic view showing how the X material is cut out from the raw material substrate (composite material M).

On the other hand, in a preferred aspect of the present invention, when the press-molded body including the portion having the hat-shaped cross section shown in FIG. 1C is manufactured, the thermoplastic reinforcing fiber composite material (X material) is pattern-cut and used in a shape like Xm shown in FIG. 3. Reference sign 2 in FIG. 3 denotes the raw material substrate. When being pattern-cut into the shape shown in FIG. 3, an amount of offcuts (reference sign 3 in FIG. 3) is smaller than that in the case of FIG. 2. By designing the shape being pattern-cut in this way, the number of thermoplastic reinforcing fiber composite materials (X material) obtained from one raw material substrate can be increased, and an amount of the occurred offcuts can be reduced.

In the present invention, when the press-molded body having a desired shape is manufactured using the thermoplastic reinforcing fiber composite material (X material) having a shape as shown in FIG. 3, the X material is placed in the mold, the mold is closed, pressure is applied to a part of the X material, and then the Y material is injected, which is a kneaded material, into the mold, and the X material and the Y material are cold pressed in the mold to be integrally molded. Since the weight average fiber length $Lw_B$ of the reinforcing fiber FB contained in the Y material is shorter than the weight average fiber length of the reinforcing fiber contained in the X material, the Y material flows more easily than the X material.

Since pressure due to injection is applied to the Y material, the Y material is a material that flows more easily than the X material.

In the present invention, by using the X material and the Y material in combination, even when Xm having the shape shown in FIG. 3 (smaller than Xm of the shape shown in FIG. 2) is used as the X material, the press-molded body shown in FIGS. 1A to 1C can be manufactured.

In the method of manufacturing a press-molded body of the present invention, in order to obtain a molded body by simultaneously pressing (hereinafter, also referred to as "simultaneous pressing") the X material and the Y material charged during pressing of the X material in the mold, the press-molded body can be manufactured by integrally molding the X material and the Y material in one molding step, and thus productivity is excellent.

In the present invention, due to the simultaneous pressing, in the obtained press-molded body, a bonding strength between an X region made of the X material and a Y region made of the Y material is also excellent.

Further, in the present invention, since the Y material, which easily flows, can be injected and pressed only in a required portion, it is possible to manufacture a molded body having a more complicated shape.

Next, the reinforcing fiber contained in the X material (composite material M) and the Y material will be described.

The X material is cut out from the composite material M that contains the reinforcing fiber FA having the weight average fiber length $Lw_A$ and the thermoplastic resin $R_X$, that is, the X material itself also contains the reinforcing fiber FA of the weight average fiber length $Lw_A$ and the thermoplastic resin $R_X$.

The Y material contains the reinforcing fiber FB having the weight average fiber length $Lw_B$ and the thermoplastic resin $R_Y$.

The X material and the Y material are molding materials, but the X material is typically a plate-shaped press molding material, whereas the Y material is a material after being kneaded. That is, in the present invention, the Y material refers to a material ready for injection in a state after a Y material precursor containing the reinforcing fiber and the thermoplastic resin $R_Y$ is kneaded (and in the subsequent steps, a material after injection).

The Y material precursor is a material containing the reinforcing fiber and the thermoplastic resin $R_Y$, and is a material that becomes a Y material by kneading. The Y material precursor may be a crushed material obtained by crushing the offcuts of the X material.

Kneading refers to mixing the molten thermoplastic resin $R_Y$ and the reinforcing fiber contained in the Y material precursor to be ready for injection.

Generally, a weight average fiber length of a reinforcing fiber contained in the Y material precursor is longer than the weight average fiber length $Lw_B$ of the reinforcing fiber FB contained in the Y material.

As described above, it is preferable that the X material is pattern-cut and cut out from the composite material M because an effect of the present invention is exhibited more remarkably. The shape of the X material is preferably the shape developed by the inverse molding analysis in the computer from the three-dimensional shape of the press-molded body to be manufactured. It is preferable that the composite material M and the X material have a plate shape. The composite material M is not particularly limited and can be manufactured by a known method. For example, the composite material M may be prepared by impregnating an opened reinforcing fiber bundle with a thermoplastic matrix resin in advance and then cutting.

The Y material is preferably obtained using an offcut as a raw material, the offcut remained after cutting out the X material from the composite material M. and more preferably obtained using a material obtained by crushing the offcut remained after cutting out the X material from the composite material M as the raw material. Accordingly, the offcut can be effectively used, and the loss of the composite material can be further reduced.

It is also preferable that the Y material is obtained by kneading the offcuts remained after cutting out the X material from the composite material M with the thermoplastic resin so as to obtain a desired $Vf_Y$ described later.

[Carbon Fiber]

Hereinafter a case where carbon fiber is used as a reinforcing fiber in the present invention is described below.

1. Carbon Fiber in General

As carbon fibers for use in the present invention, polyacrylonitrile (PAN)-based carbon fibers, petroleum/coal pitch-based carbon fibers, rayon-based carbon fibers, cellulose-based carbon fibers, lignin-based carbon fibers, phenol-based carbon fibers, and the like are generally known. In the present invention, any of these carbon fibers can be preferably used. Among these, in the present invention, it is preferable to use polyacrylonitrile (PAN)-based carbon fibers because of excellent tensile strength thereof.

2. Sizing Agent for Carbon Fiber

The carbon fiber used in the present invention may have a sizing agent attached to a surface thereof. When the carbon fiber is attached with the sizing agent, a type of the sizing agent can be appropriately selected depending on a type of the carbon fiber and a type of the thermoplastic resin to be used in the X material (composite material M) or the Y material, and is not particularly limited.

3. Fiber Diameter of Carbon Fiber

A fiber diameter of a single fiber of the carbon fiber used in the present invention (generally, the single fiber may be referred to as a filament) may be appropriately determined depending on the type of the carbon fiber, and is not particularly limited. In general, an average fiber diameter is preferably in a range of 3 μm to 50 μm, more preferably in a range of 4 μm to 12 μm, and still more preferably in a range of 5 μm to 8 μm. When the carbon fiber is in a form of fiber bundle, the diameter refers to a diameter of the carbon fiber (single fiber) that forms the fiber bundle, not a diameter of the fiber bundle. The average fiber diameter of the carbon fiber can be measured by, for example, a method described in JIS R7607:2000.

[Glass Fiber]

Hereinafter a case where glass fiber is used as a reinforcing fiber in the present invention is described below.

1. Glass Fiber in General

Glass fibers used in the present invention may be any glass fibers as long as they are generally called glass fibers. The glass composition is not particularly limited to A glass, C glass, E glass and the like. The glass composition may contain components such as $TiO_2$, $SO_3$, and $P_2O$ in some cases.

2. Sizing Agent for Glass Fiber

The glass fiber used in the present invention may have a sizing agent attached to a surface thereof. When the glass fiber is attached with the sizing agent, a type of the sizing agent can be appropriately selected depending on a type of the glass fiber and a type of the thermoplastic resin to be used in the Xg material (composite material Mg) or the Yg material, and is not particularly limited. Glass fibers pre-treated with a conventionally known coupling agent such as an organic silane compound, an organic titanium compound, an organic borane compound and an epoxy compound can be preferably used.

3. Fiber Diameter of Glass Fiber

An average fiber diameter of the glass fibers is preferably in a range of 1 μm to 50 μm, more preferably in a range of 5 μm to 20 μm. An average fiber diameter that is too small makes it difficult to impregnate the fibers with the thermoplastic resin. An average fiber diameter that is too large adversely affects moldability and workability.

[Reinforcing Fiber FA]

The X material (composite material M) in the present invention contains the reinforcing fiber FA having the weight average fiber length $Lw_A$. $Lw_A$ is longer than the weight average fiber length $Lw_B$ of the reinforcing fiber FB contained in the Y material used.

The weight average fiber length $Lw_A$ of the reinforcing fiber FA is 1 mm or more and 100 mm or less, more preferably 3 mm or more and 80 mm or less, and particularly preferably 5 mm or more and 60 mm or less. When $Lw_A$ is 100 mm or less, a fluidity of the X material (composite material M) is unlikely to decrease, and a press-molded body having a desired shape is easily obtained at the time of the press molding. When $Lw_A$ is 1 mm or more, a mechanical strength of the press-molded body is not decreased, which is preferable.

[Weight Average Fiber Length of Reinforcing Fiber FA]

In the present invention, reinforcing fibers FA having different fiber lengths may be used in combination. In other words, the reinforcing fibers FA used in the present invention may have a single peak or a plurality of peaks in a weight average fiber length distribution. As for the carbon fiber included in an injection molded body and an extrusion molded body, those that undergo a sufficient kneading step to uniformly disperse the carbon fibers in the injection (extrusion) molded body generally have a weight average fiber length of the carbon fiber of less than 1 mm.

An average fiber length of the reinforcing fiber FA can be obtained based on the following equation (1), for example, by measuring fiber lengths of 100 fibers randomly selected from a molded body up to a unit of 1 mm using a caliper or the like.

When a fiber length of each carbon fiber is set to Li and the number of the measured fibers is set to j, a number average fiber length (Ln) and a weight average fiber length (Lw) are generally obtained according to the following equations (1) and (2).

$$Ln = \Sigma Li / j \qquad \text{Equation (1)}$$

$$Lw = (\Sigma Li^2)(\Sigma Li) \qquad \text{Equation (2)}$$

When the fiber length is constant, the number average fiber length and the weight average fiber length have the same value. Extraction of the reinforcing fiber FA from the press-molded body can be performed, for example, by subjecting the press-molded body to a heat treatment at about 500° C. for about 1 hour and removing a resin in a furnace.

[Carbon Fiber B]

The Y material in the present invention contains the reinforcing fiber FB having the weight average fiber length $Lw_B$. $Lw_B$ is shorter than the weight average fiber length $Lw_A$ of the reinforcing fiber FA contained in the X material (composite material M) used.

The weight average fiber length $Lw_B$ of the reinforcing fiber FB is preferably 1.0 mm or less. When $Lw_B$ is 1.0 mm or less, it is easy to manufacture the Y material by injection. $Lw_B$ is preferably 0.1 mm or more. When $Lw_B$ is 0.1 mm or more, mechanical properties in the Y region are easily ensured.

Since the weight average fiber length $Lw_B$ of the reinforcing fiber FB contained in the Y material is one after being kneaded, the weight average fiber length of the carbon fiber included in the Y region made of the Y material in the press-molded body manufactured by the manufacturing method of the present invention is the same as $Lw_B$.

[Weight Average Fiber Length of Carbon Fiber B]

In the present invention, carbon fibers B having different fiber lengths may be used in combination. In other words, the carbon fibers B used in the present invention may have a single peak or a plurality of peaks in a weight average fiber length distribution.

The weight average fiber length and the number average fiber length of the reinforcing fiber FB can be measured in the same manner as in the above equations (1) and (2). A method of measuring a fiber length of the reinforcing fiber FB will be described later.

[Volume Fraction of Reinforcing Fibers in X Material and Y Material]

For each of the X material and the Y material, a reinforcing fiber volume fraction (Vf) can be obtained by the following equation (3).

The reinforcing fiber volume fraction is not particularly limited, but the reinforcing fiber volume fraction (Vf) is preferably 10 vol % to 60 vol %, more preferably 20 vol % to 50 vol %, and still more preferably 25 vol % to 45 vol %.

$$\text{Reinforcing fiber volume fraction}(Vf) = 100 \times \text{reinforcing fiber volume}/(\text{reinforcing fiber volume} + \text{thermoplastic resin volume}) \qquad \text{Equation (3)}$$

In the present invention, it is preferable in a manufacturing process that a reinforcing fiber volume fraction $Vf_X$ of the X material and a reinforcing fiber volume fraction $Vf_Y$ of the Y material satisfy a relationship $Vf_X \geq Vf_Y$. When a material obtained by crushing the offcut remained after cutting out the X material from the composite material (raw material substrate) containing the reinforcing fiber and the thermoplastic resin is used as the Y material, $Vf_X = Vf_Y$, and when the Y material is manufactured by further adding a thermoplastic resin after crushing the offcuts, $Vf_X > Vf_Y$. That is, if the manufacturing method such that $Vf_X \geq Vf_Y$ is adopted, the offcut remained after cutting out the X material can be efficiently used.

$Vf_X$ is preferably 20 Vol % to 45 Vol %, more preferably 25 Vol % to 40 Vol %.

$Vf_Y$ is preferably 1 Vol % to 40 Vol %, more preferably 5 Vol % to 30 Vol %, and still more preferably 10 Vol % to 25 Vol %.

Next, the thermoplastic resin contained in the X material and the Y material will be described.

[Thermoplastic Resin]

The thermoplastic resin (thermoplastic matrix resin) used in the present invention is not particularly limited, and a thermoplastic resin having a desired softening point or melting point can be appropriately selected and used. As the thermoplastic resin, a thermoplastic resin having a softening point in a range of 180° C. to 350° C. is generally used, but the thermoplastic resin is not limited thereto.

Examples of the thermoplastic resin include a polyolefin resin, a polystyrene resin, a polyamide resin, a polyester resin, a polyacetal resin (polyoxymethylene resin), a polycarbonate resin, a (meth) acrylic resin, a polyarylate resin, a polyphenylene ether resin, a polyimide resin, a polyether nitrile resin, a phenoxy resin, a polyphenylene sulfide resin, a polysulfone resin, a polyketone resin, a polyetherketone resin, a thermoplastic urethane resin fluorine-based resin, a thermoplastic polybenzimidazole resin, and the like.

The thermoplastic resin used in the X material and the Y material of the present invention may be only one type or two or more types. Example of a mode in which two or more types of thermoplastic resins are used in combination include, but not limited to, a mode in which thermoplastic resins having different softening points or melting points are used in combination, and a mode in which thermoplastic resins having different average molecular weights are used in combination.

The thermoplastic resin $R_X$ contained in the X material is preferably the same type of thermoplastic resin as the thermoplastic resin $R_Y$ contained in the Y material.

[Step of Placing X Material in Mold]

The step of placing the X material in the mold in the present invention can be performed by a previously known method. In the present invention, in order to perform the cold pressing, the X material is preferably placed in a mold in a state of being heated in advance. When the thermoplastic resin contained in the X material is crystalline, the thermoplastic resin is preferably heated to a temperature equal to or higher than a melting point and equal to or lower than a decomposition temperature, and when the thermoplastic resin is amorphous, the thermoplastic resin is preferably heated to a temperature equal to or higher than a glass transition temperature and equal to or lower than a decomposition temperature. A temperature of the mold is preferably adjusted to be lower than a melting point when the thermoplastic resin contained in the X material is crystalline, and lower than a glass transition temperature when the thermoplastic resin is amorphous. The cold pressing can be suitably performed by adjusting a temperature of the X material and the temperature of the mold.

Before starting the pressing, the X material is preferably preliminarily shaped.

[Step of Closing Mold, Starting Applying Pressure to Part of X Material, and then Injecting Y Material into Mold]

In the present invention, after the X material is placed in the mold, the mold is closed. Here, in the present invention, the mold is closed (typically, an upper mold is lowered), and the pressure is started to be applied to a part of the X material (preferably immediately after the pressure starts to be applied to at least a part of the X material), the Y material is injected into the mold (preferably charged into the mold by the injection device).

A start of application of the pressure to a part of the X material can be generally confirmed with a pressure gauge provided in a press molding machine. More specifically, it is possible to confirm that an upper mold of the mode (upper mold) is lowered and comes into contact with the X material, and then the pressure is output to the pressure gauge of the press molding machine.

A method for injecting the Y material into the mold is not particularly limited, and can be performed by a previously known method. For example, there is a method in which a gate is provided in the mold and a Y material is injected from an outside of the mold by the injection device. The number of gates and a position at which the gate is provided for injecting the Y material are not particularly limited, and for example, one gate may be provided in a lower mold at a position on a top plane of the press-molded body (see FIG. 12).

Figure 12:
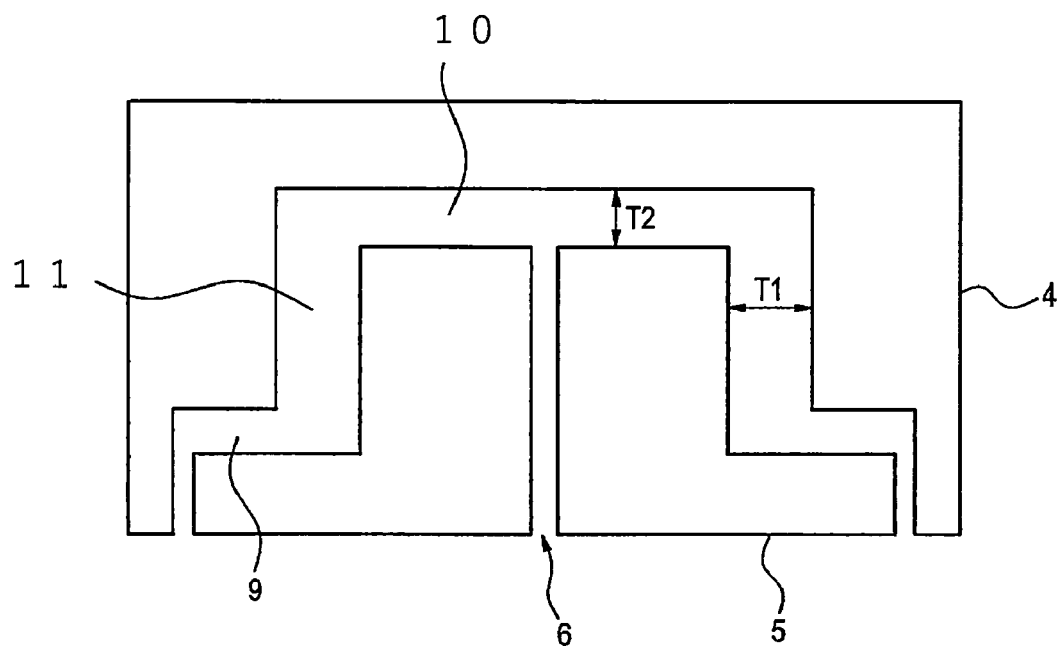
FIG. 12 is a schematic cross-sectional view showing an example of the mold.

In addition, as another example, two or more gates are provided in the lower mold in a cavity region for forming the top plane portion of the press-molded body, one or more gates are provided in the upper mold in a cavity region for forming the top plane portion of the press-molded body, and one or more gates are provided in the lower mold or upper mold in a cavity region (for example, a cavity region for forming a flange portion) other than cavity regions for forming the top plane portion and the standing plane portion of the press-molded body. It is preferable that the position of the gate and an end portion of a cavity (end portion of the flange portion, or the like) are far from each other. This is because, after the Y material reaches the end portion of the cavity, the Y material flows in a plate thickness direction of the molded body, and further, the Y material flows backward from the end portion of the cavity toward a center, and the X material is pushed away to generate waviness or the like. It is preferable that the positions of the gates are not unevenly distributed. This is because it is possible to prevent occurrence of warpage of the molded body due to a difference in a cooling start time of the molding material caused by a difference in a charging time of the Y material. Although it is possible to set a large number of gates and shorten the charging time of the Y material, in the present invention, it may be preferable that the number of gates be small. This is because it is possible to prevent occurrence of welds due to collision of the Y materials injected from injection gates with each other in the mold, and to prevent a decrease in a strength. FIG. 12 is a schematic cross-sectional view of an example of a mold used in the present invention.

In the present invention, it is preferable that a volume of the X material to be used $V_X$ and a volume of the Y material to be used $V_Y$ satisfy a relationship of $V_X \geq V_Y$. $V_X:V_Y$ is preferably 90:10 to 50:50, more preferably 80:20 to 60:40.

When $V_X:V_Y$ is 90:10 to 50:50, for example, the X material is used to form a main portion of the press-molded body, and only a required portion (for example, an end portion or a narrow portion) can be formed using the Y material with a high fluidity.

A pressure at the time of injecting the Y material is preferably 30 kgf/m² to 200 kgf/m², more preferably 40 kgf/m² to 150 kgf/m². A heating temperature of the Y material is not particularly limited, but for example, when nylon 6 is used as the thermoplastic resin, the heating temperature is preferably 200° C. to 300° C.

[Step of Cold Pressing X Material and Y Material in Mold to Integrally Mold X Material and Y Material]

The cold pressing can be performed using a previously known method.

In a cold pressing method, for example, a thermoplastic reinforcing fiber composite material (sometimes referred to as a general term for the X material and the Y material) heated to the first predetermined temperature is charged into a mold set at a second predetermined temperature, and then pressurized and cooled.

Specifically, when the thermoplastic resin forming the thermoplastic reinforcing fiber composite material is crystalline, the first predetermined temperature is equal to or higher than the melting point, and the second predetermined temperature is less than the melting point. When the thermoplastic resin is amorphous, the first predetermined temperature is equal to or higher than the glass transition temperature, and the second predetermined temperature is less than the glass transition temperature. That is, the cold pressing method includes at least the following steps A-1) and A-2).

Step A-1) A step of heating the thermoplastic reinforcing fiber composite material to a temperature equal to or higher than the melting point and equal to or lower than the decomposition temperature when the thermoplastic resin is crystalline, or to a temperature equal to or higher than the glass transition temperature and equal to or lower than the decomposition temperature when the thermoplastic resin is amorphous.

Step A-2) A step of placing the thermoplastic reinforcing fiber composite material heated in step A-1) in a mold whose temperature is adjusted to be lower than the melting point when the thermoplastic resin is crystalline, or to be lower than the glass transition temperature when the thermoplastic resin is amorphous, and performing pressurization.

By performing these steps, molding of the thermoplastic reinforcing fiber composite material can be completed (the press-molded body can be manufactured).

Each of the steps described above needs to be performed in an order described above, but other steps may be included between the steps. The other steps include, for example, before step A-2), a shaping step of shaping the thermoplastic reinforcing fiber composite material in advance into a shape of a cavity of the mold using a shaping mold different from the mold used in step A-2). Step A-2) is a step of applying pressure to the thermoplastic reinforcing fiber composite material to obtain a molded body having a desired shape. A molding pressure at this time is not particularly limited, is preferably less than 20 MPa, and more preferably 10 MPa or less with respect to a projected area of a mold cavity. As a matter of course, various steps may be inserted between the above steps during the press molding, and for example, vacuum press molding in which the press molding is performed under vacuum may be used.

Since the Y material is charged into the mold by injection, the Y material when charged into the mold is generally equal to or higher than the melting point and equal to or lower than a decomposition temperature when the thermoplastic resin is crystalline, and generally equal to or higher than the glass transition temperature and equal to or lower than the decomposition temperature when the thermoplastic resin is amorphous.

In the present invention, it is preferable that the X material has a plate shape, and the Y material flows and extends in an in-plane direction of the X material to manufacture a press-molded body.

[Press-Molded Body]

A shape of the press-molded body manufactured by the present invention is not particularly limited. The press-molded body manufactured by the present invention preferably has at least one flat plane portion having at least one thickness (plate thickness), and may have a T-shaped, L-shaped. U-shaped, hat-shaped cross section, or a three-dimensional shape including these, and may further have a concavo-convex shape (for example, a rib, a boss, or the like). It is preferable that a shape of the press-molded body manufactured by the present invention is a shape including a portion having a hat-shaped cross section.

Figure 16:
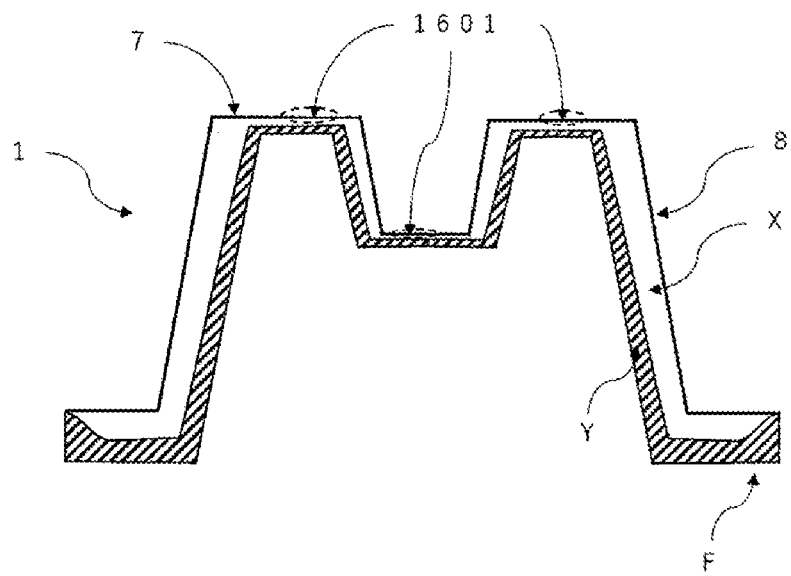
FIG. 16 is a schematic view showing an example of the press-molded body (double hat shape).

FIG. 16 is a press-molded body having a double hat shape. In the case of the double hat shape as shown in FIG. 16, since the X material of the standing plane portion is molded while being dragged downward by the upper mold, in the press molding using only the X material, a plate thickness of the top plane (for example, 1601 in FIG. 16) is reduced, so that the molding pressure is lost, and there is a possibility that a decrease in physical properties and an appearance defect occur.

In the present invention, since a defect portion can be compensated by the Y material, it is possible to manufacture the press-molded body having a double hat shape more easily.

Figure 18:
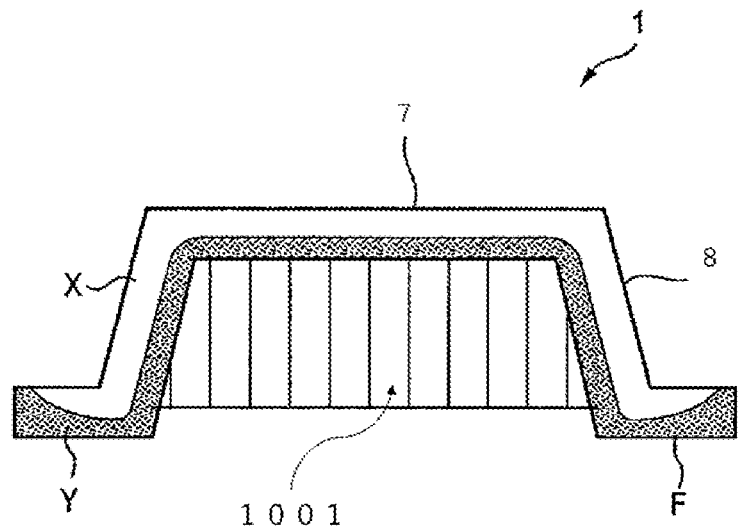
FIG. 18 is a schematic view showing an example of the press-molded body, in which a rib is prepared using the Y material.
Figure 19:
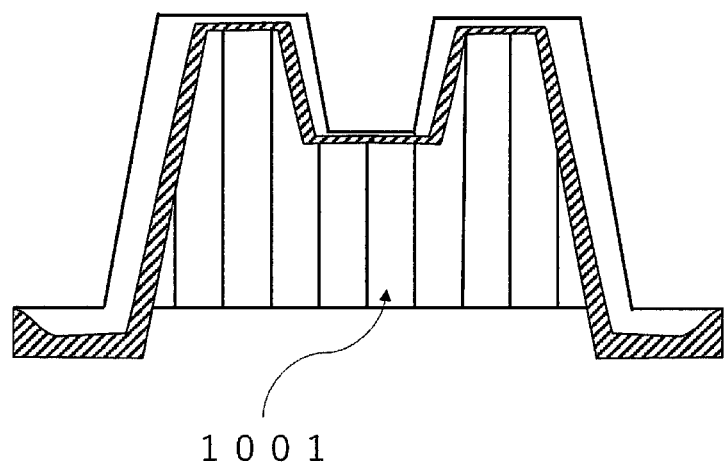
FIG. 19 is a schematic view showing an example of the press-molded body, in which a rib is formed using the Y material.

As in 1001 of FIGS. 18 and 19, it is also possible to provide ribs in a hat portion mainly by the Y material. By providing the ribs, rigidity of the press-molded body can be improved.

In the present invention, $Q_X:Q_Y$, which is a ratio of a total weight $Q_X$ of the X material to be used to a total weight $Q_Y$ of the Y material to be used, is 99:1 to 50:50. It is preferable that a proportion of the Y region made of the Y material increases toward at least one end portion in the in-plane direction of the press-molded body, and it is more preferable that at least one end portion in the in-plane direction of the press-molded body is formed of only the Y region made of the Y material.

Figure 10:
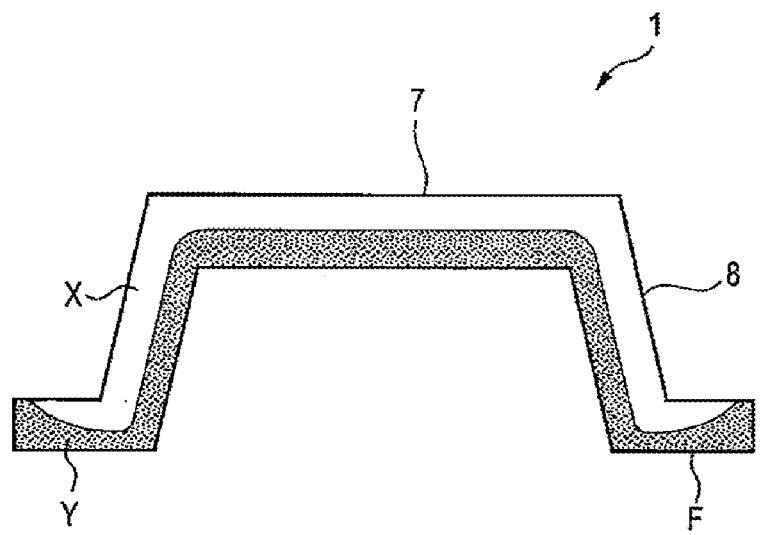
FIG. 10 is a schematic cross-sectional view showing an X region made of the X material and a Y region made of a Y material in an example of the press-molded body.

It is preferable that the press-molded body manufactured in the present invention has a transition section XY in which the X region made of the X material and the Y region made of the Y material are stacked, and an end portion in the in-plane direction formed of only the Y region is continuously formed with a Y region of the transition section XY. A schematic cross-sectional view of an example of such a press-molded body is shown in FIG. 10.

As described above, since at least one end portion in the in-plane direction of the press-molded body is formed of only the Y region made of the Y material, the loss (short shot) of the end portion of the press-molded body is prevented, dimensional stability is excellent, and occurrence of burrs is also reduced. Since the Y material flows more easily than the X material, occurrence of missing can be prevented by flowing to an end of the mold in the press molding. Since the weight average fiber length $Lw_B$ of the reinforcing fiber FB included in the Y material is 0.1 mm or more, occurrence of burrs at the end portion can also be prevented.

$Q_X:Q_YY$ is more preferably 95:5 to 50:50, and even more preferably 90:10 to 70:30.

Figure 4A:
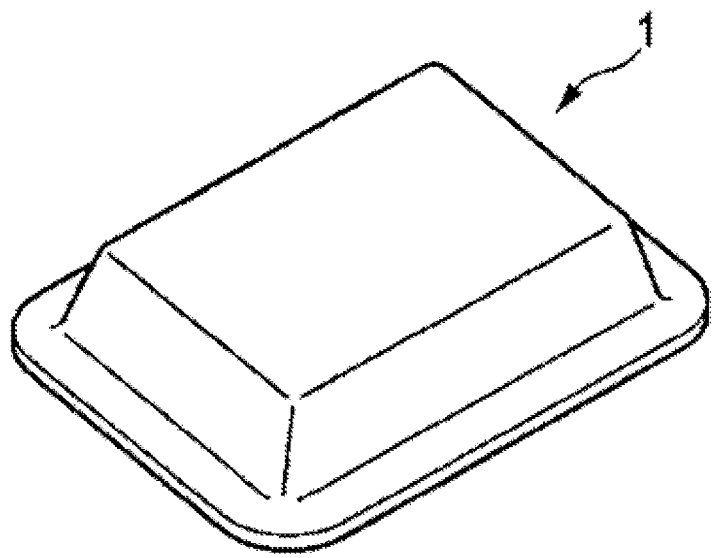
FIG. 4A is a schematic view showing an example of the press-molded body.
Figure 4B:
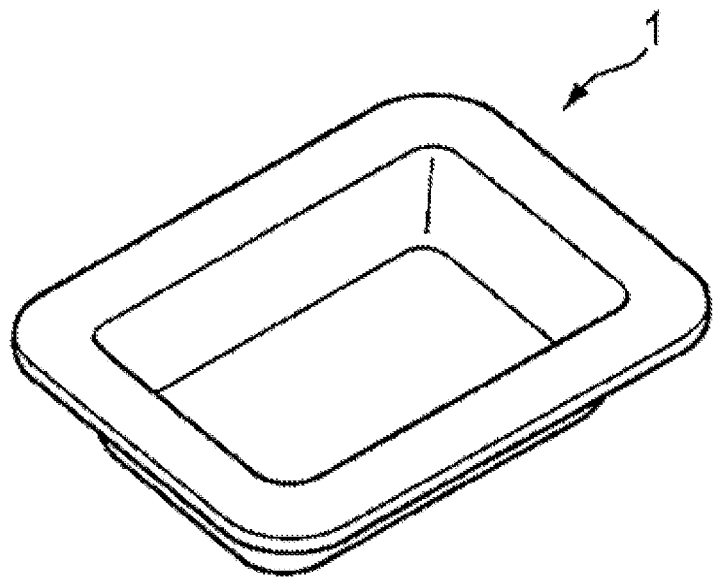
FIG. 4B is a schematic view showing an example of the press-molded body in which the press-molded body of FIG. 4A turned upside down.

Examples of the press-molded body manufactured by the present invention include the press-molded body shown in FIGS. 1A to 1C and the press-molded body shown in FIGS. 4A and 4B.

FIG. 1A to 1C is a schematic view of a press-molded body including a portion having a hat-shaped cross section, in which FIG. 1A is a perspective view of the press-molded body, FIG. 1B is a plan view of the press-molded body, and FIG. 1C is a cross-sectional view (hat shape) when the press-molded body is cut by a dashed-dotted line s in FIG. 1B. The press-molded body of FIGS. 1A to 1C has an X region (reference sign X in FIGS. 1A to 1C) and a Y region (reference sign Y in FIGS. 1A to 1C), and has a transition section XY indicated by reference sign xy in FIG. 1C.

In the present invention, in order for an obtained press-molded body to have the transition section XY, it is preferable to simultaneously press the X material and the Y material in a state where at least a part of the X material and a part of the Y material overlap.

It is preferable that the press-molded body manufactured by the present invention has a flange portion, and at least one end portion in an in-plane direction of the flange portion is formed of only the Y region. The flange portion is a portion corresponding to a brim of a hat for the portion having the hat-shaped cross section, and is a portion indicated by reference sign F in FIGS. 1A to 1C. As shown in FIG. 1C, the press-molded body of FIG. 1C has a portion in which an end portion in an in-plane direction of the flange portion F is formed of only the Y region.

In the method of manufacturing a press-molded body of the present invention, in order to obtain the molded body by simultaneously pressing (hereinafter, also referred to as "simultaneous pressing") the X material and the Y material charged during pressing of the X material in the mold, the press-molded body can be manufactured by integrally molding the X material and the Y material in one molding step, and thus the productivity is excellent.

In the present invention, due to the simultaneous pressing, in the obtained press-molded body, the bonding strength between the X region made of the X material and the Y region made of the Y material is also excellent.

Further, in the present invention, since the Y material, which easily flows, can be injected and pressed only in a required portion, it is possible to manufacture a molded body having a more complicated shape (for example, a molded body having a rib or a boss).

[Injection-Press Hybrid Molded Body]

In the present invention, the Y material injected into the mold (preferably inserted into the mold by an injection molding machine) is also press molded with the X material. Since both injection and press are used, the "press-molded body" in the present invention can also be referred to as an "injection-press hybrid molded body".

[Preferred Shape of Press-Molded Body]

The press-molded body manufactured by the manufacturing method of the present invention preferably has at least a top plane portion and a standing plane portion. The top plane portion is a portion including a top surface of the press-molded body. The top plane portion is integrally connected to the standing plane portion. The standing plane portion is a portion including a standing plane, and is a portion (side plane portion) extending in a direction intersecting with the top plane portion. An angle between the standing plane portion and the top plane portion is not particularly limited, but is preferably, for example, more than 90 degrees and less than 180 degrees, more preferably more than 90 degrees and less than 135 degrees, and still more preferably more than 90 degrees and less than 120 degrees.

The top plane portion may also be a bottom plane portion (when the press-molded body is viewed upside down) depending on a viewpoint.

The press-molded body manufactured by the manufacturing method of the present invention may have a portion other than the top plane portion and the standing plane portion. For example, a flange portion or the like connected to the standing plane portion may be included.

It is preferable that a thickness t1 of the standing plane portion and a thickness t2 of the top plane portion of the press-molded body manufactured by the manufacturing method of the present invention satisfy a relationship of t1>t2. That is, a thickness of the standing plane portion is larger than a thickness of the top plane portion.

A value of t1 is not particularly limited, but the value of t1 is preferably 1.0 mm or more and less than 5.0 mm, more preferably 1.5 mm or more and less than 4.0 mm, and still more preferably 2.0 mm or more and less than 3.5 mm.

A value of 2 Qis not particularly limited, but the value of t2 is preferably 0.5 mm or more and less than 4.0 mm, more preferably 1.0 mm or more and less than 3.5 mm, and still more preferably 1.0 mm or more and less than 2.0 mm.

A relationship between t1 and t2 is preferably t1>t2×1.2, more preferably t1>t2×1.3, and still more preferably t1>t2×1.4.

When the standing plane portion of the press-molded body has an uneven thickness structure (when the thickness of the standing plane portion is not constant), a minimum plate thickness of the standing plane portion is set to t1.

Similarly, when the top plane portion has an uneven thickness structure (when the thickness of the standing plane portion is not constant), a minimum plate thickness of the top plane portion is set to t2. Whether the Y material can smoothly flow through a flow path is due to a narrowest portion of the cavity, and it is necessary to expand a flow path of a narrowest cavity.

Figure 11:
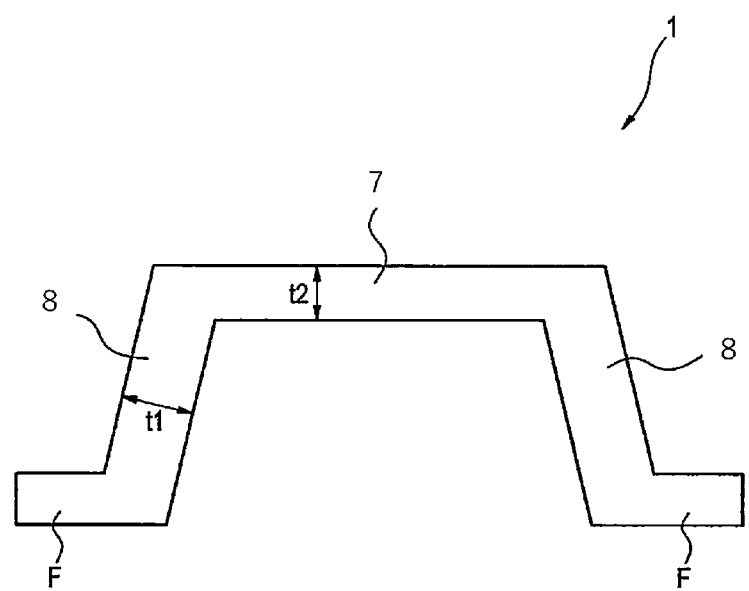
FIG. 11 is a schematic cross-sectional view showing an example of the press-molded body.

FIG. 11 is a schematic cross-sectional view of an example of the press-molded body manufactured by the manufacturing method of the present invention. A press-molded body 1 of FIG. 11 has a top plane portion 7 and a standing plane portion 8 connected to the top plane portion 7. The press-molded body 1 has a flange portion F connected to the standing plane portion 8.

[Other Shapes]

Figure 17:
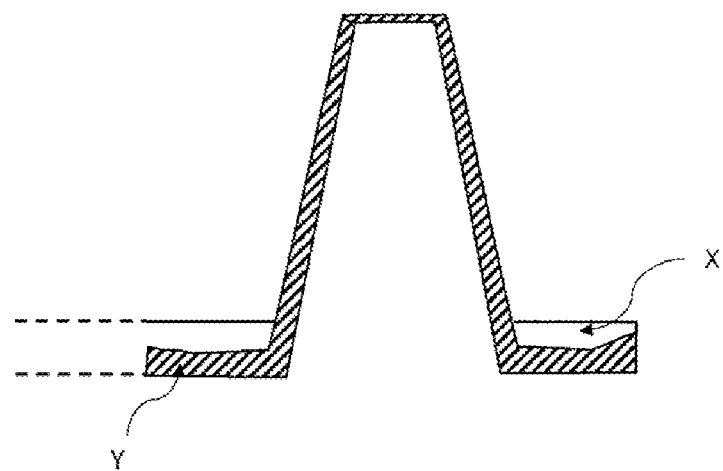
FIG. 17 is a schematic cross-sectional view in which a local protrusion region is made of the Y material. Note that the molded body of the present invention extends along dotted lines.

In order to improve a yield of the X material, it is preferable to manufacture a local protrusion shape only by the Y material. For example, as drawn in FIG. 17, the press-molded body of the present invention may have a molded body region in which a protrusion portion is made of the Y material and a flat plane portion is made of the X material. Note that the molded body of the present invention extends along dotted lines drawn in FIG. 17.

[Thickness when Press-Molded Body has Uneven Thickness Structure]

When an uneven thickness structure (a portion having a non-constant thickness) is provided on the standing plane portion, the top plane portion, the flange portion, or the like of the press-molded body, the Y material contributes to the uneven thickness structure. Since the X material has a plate shape and the Y material is an injection material, it is easy to manufacture a molded body having an uneven thickness structure.

For example, in the case of manufacturing a molded body having an uneven thickness structure gradually increasing from 2 mm to 3 mm, when an X material having a thickness of 1 mm is placed on the mold, a remaining 1 mm to 2 mm uneven thickness region is formed by the Y material.

[Springback Amount and Thickness of Cavity Region]

It is preferable that the X material has a springback amount of more than 1.0 and less than 14.0, the press-molded body has a standing plane portion and a top plane portion, in the cold pressing, the Y material is caused to flow from a cavity region other than a cavity region for forming the standing plane portion to a cavity region for forming the standing plane portion, and the thickness t1 of the standing plane portion and the thickness t2 of the top plane portion satisfy t1>t2.

It is preferable that a thickness T1 of the cavity region for forming the standing plane portion and a plate thickness $tx_1$ of X material with springback satisfy $T1>T_{x1}$.

A preferable springback amount of the X material in the present invention is more than 1.0 and less than 14.0. Here, the springback amount is a value obtained by dividing a plate thickness of a preheated molding material by a plate thickness of the molding material before preheating. That is, when a plate thickness of the X material before preheating is $t_{x0}$ and a plate thickness of preheated X material is $t_{x1}$, the springback amount of the X material is $t_{x1}/t_{x0}$. The springback amount of the X material in the present invention is preferably more than 1.0 and 7.0 or less, more preferably more than 1.0 and 5.0 or less, still more preferably more than 1.0 and 3.0 or less, and even more preferably more than 1.0 and 2.5 or less.

In the present invention, it is preferable to use a mold having a cavity in which the thickness T1 of the cavity region for forming the standing plane portion and a thickness T2 of a cavity region for forming the top plane portion are T1>T2. By using such a mold, the Y material, which is an injection molding material, can flow from the cavity region (for example, the cavity region for forming the top plane portion) other than the cavity region for forming the standing plane portion to the cavity region for forming the standing plane portion.

A value of T1 is not particularly limited, but the value of T1 is, for example, preferably 1.0 mm or more and less than 5.0 mm, more preferably 1.5 mm or more and less than 4.0 mm, and still more preferably 2.0 mm or more and less than 3.5 mm.

A value of T2 is not particularly limited, but the value of T2 is, for example, preferably 0.5 mm or more and less than 4.0 mm, more preferably 1.0 mm or more and less than 3.5 mm, and still more preferably 1.0 mm or more and less than 2.0 mm.

A relationship between T1 and T2 is preferably T1>T2×1.2, more preferably T1>T2×1.3, and still more preferably T1>T2×1.4.

The thickness of the press-molded body and the thickness of the cavity of the mold correspond to each other, and in principle, T1=t1 and T2=t2.

In the present invention, it is preferable that the thickness T1 of the cavity region for forming the standing plane portion and a plate thickness $t_{x1}$ of the preheated X material with springback satisfy $T1>t_{x1}$.

When the springback amount of the X material is more than 1.0, as shown in FIG. 14, when the X material whose thickness before heating is $t_{x0}$ is heated, the thickness of the X material increases to $t_{x1}$ due to springback. As shown in FIG. 15, in the case of manufacturing a press-molded body in which a material is placed on a lower mold 5 and t1=t2 (that is, T1=T2) and $T1>t_{x1}$ (in the case of using a molding cavity), when the Y material, which is the kneaded material, is charged from the cavity region for forming the top plane portion, the Y material can easily proceed to a mold cavity region for forming the standing plane portion, the flange portion, and the like without being blocked by the X material with springback.

In the case of manufacturing a molded body in which the standing plane portion has an uneven thickness structure (when the thickness of the standing plane portion is not constant), a thickness of the cavity region for forming the standing plane portion also has an uneven thickness structure. In this case, a thickness of the narrowest portion is assumed to be the thickness T1 of the cavity region for forming the standing plane portion. Similarly, in the case of manufacturing a molded body in which the plate thickness of the top plane portion is an uneven thickness structure (when the thickness of the top plane portion is not constant), a thickness of the cavity region for forming the top plane portion also has an uneven thickness structure. In this case, a thickness of the narrowest portion is assumed to be the thickness T2 of the cavity region for forming the top plane portion. Whether the Y material can smoothly flow through the flow path is due to the narrowest portion of the cavity, and it is preferable to expand the flow path of the narrowest cavity.

[Others]

In the present invention, weight means mass.

Example

Hereinafter, the present invention will be specifically described with reference to Examples, but the present invention is not limited thereto.

1. Raw materials used in the following Manufacturing Examples and Examples are as follows. A decomposition temperature is a measurement result by thermogravimetric analysis.

(PAN-Based Carbon Fiber)

Carbon fiber "Tenax" (registered trademark) STS40-24K (average fiber diameter: 7 μm), manufactured by TEIJIN LIMITED.

(Thermoplastic Resin)

Polyamide 6: hereinafter sometimes abbreviated as PA6.

A crystalline resin, melting point: 225° C., decomposition temperature (in air): 300° C.

2. Evaluation Method 2.1 Analysis of Carbon Fiber Volume fraction (Vf)

Samples were cut out from an X region and a Y region of a press-molded body, and burned in a furnace at 500° C. for 1 hour to remove a thermoplastic resin, and masses of the carbon fiber and the thermoplastic resin were calculated by weighing masses of the sample before and after treatment. Next, volume fractions of the carbon fiber and the thermoplastic resin were calculated by using a specific gravity of each component.

$Vf=100\times$carbon fiber volume/(carbon fiber volume+ thermoplastic resin volume)

2.2 Analysis of Weight Average Fiber Length

Weight average fiber lengths of carbon fibers contained in the X material, the Y material, the raw material substrate (composite material M), and the press-molded body are measured in advance by removing the thermoplastic resin in the furnace at about 500° C. for 1 hour.

2.2.1 Carbon Fiber A Contained in X Material

After cutting out a part corresponding to the X material from the press-molded body and removing the thermoplastic resin contained in the X material, lengths of 100 randomly extracted carbon fibers were measured and recorded up to a unit of 1 mm with a caliper, and the weight average fiber length ($Lw_A$) was obtained according to the following equation from measured lengths (Li, where i=an integer of 1 to 100) of all the carbon fibers.

$$Lw_A=(\Sigma Li^2)/(\Sigma Li) \quad \text{Equation (2)}$$

Weight average fiber lengths of the carbon fiber A contained in the X region of the raw material substrate (composite material M) and the press-molded body can also be measured by a similar method as described above after removing the thermoplastic resin contained in the X region.

2.2.2 Carbon Fiber B Contained in Y Material

After cutting out a part corresponding to the Y material from the press-molded body and removing the thermoplastic resin, the obtained carbon fiber was charged into water containing a surfactant and sufficiently stirred by ultrasonic vibration. Stirred dispersion was randomly collected by a measuring spoon to obtain an evaluation sample, and lengths of 3000 fibers was measured by an image analyzer LuzerAP manufactured by Nireco Corporation.

Using the measured value of the carbon fiber length, a number average fiber length $Ln_B$ and the weight average fiber length $Lw_B$ were obtained similarly as in the above equations (1) and (2).

2.4 Short Shot

The flange portion (end portion) of the obtained press-molded body was observed, and occurrence of a short shot (missing) was evaluated according to following criteria.
Perfect: There was no missing.
Excellent: There was one missing part.
Great: There were two missing parts.
Good: A continuous missing occurs in the flange portion in either a length direction or a width direction.
Bad: A continuous missing occurs in the flange portion in the length direction and the width direction.

Example 1

(Manufacturing of Raw Material Substrate)

A carbon fiber "Tenax" (registered trademark) STS40-24K (average fiber diameter: 7 μm, number of single fibers: 24,000) manufactured by TEJIN LIMITED and cut to a fiber length of 20 mm was used as the carbon fiber, and nylon 6 resin A1030 manufactured by Unitika Ltd. was used as the resin. Based on a method described in U.S. Pat. No. 8,946,342, a composite material of the carbon fiber and the nylon 6 resin was prepared, in which carbon fibers were randomly oriented in two dimensions. The obtained composite material was heated at 2.0 MPa for 5 minutes in a press device heated to 260° C. to obtain a plate-shaped raw material substrate (composite material M) having an average thickness of 1.5 mm, a width of 800 mm, and a length of 1000 mm. When the carbon fibers contained in the plate-shaped raw material substrate were analyzed, the carbon fiber volume fraction (Vf) was 35 Vol %, the fiber length of the carbon fibers was constant, and the weight average fiber length was 20 mm.

(Preparation of X Material)

Figure 5:
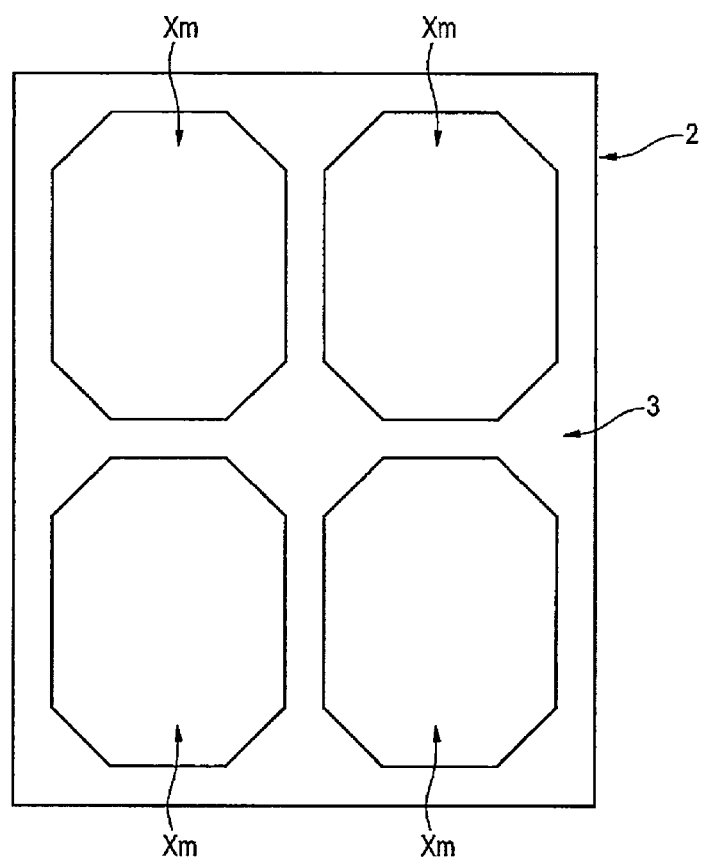
FIG. 5 is a schematic view showing how the X material is cut out from the raw material substrate.
Figure 9:
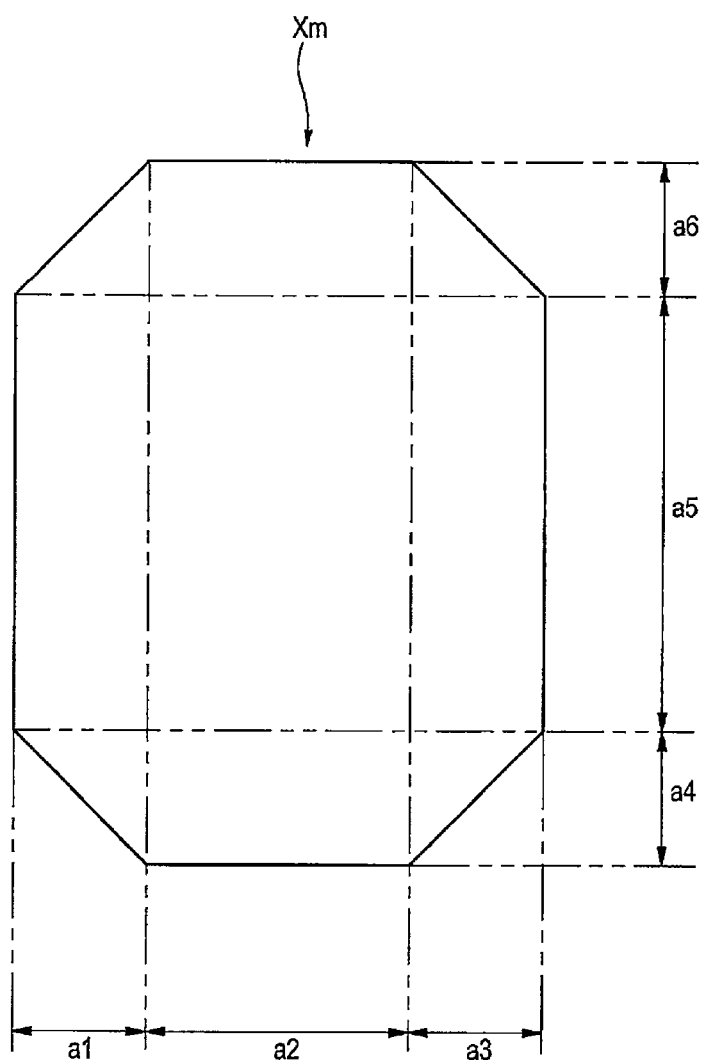
FIG. 9 is a schematic view showing the X material cut out from the raw material substrate.

An X material (Xm in FIG. 5) was prepared by cutting a plate-shaped raw material substrate as shown in FIG. 5 (all of cut-out X materials have same shape). FIG. 9 is a plan view of the cut-out X material (Xm in FIG. 5), in which lengths a1, a3, a4, and a6 are 50 mm, a length a2 is 260 mm, and a length a5 is 380 mm. The weight average fiber length $Lw_A$ of the carbon fiber contained in the X material was 20 mm, and the fiber volume fraction ($Vf_X$) of the X material was 35 Vol %.

(Manufacturing of Y Material)

A Y material was prepared from the offcut (a remaining portion obtained by cutting out Xm in FIG. 5) occurred after the X material (Xm in FIG. 5) was prepared. Specifically, the offcut is supplied to a commercially available cutting machine and is cut. By appropriately changing a cutting blade size, a cutting blade interval, a pulverization time, and a rotation speed of the cutting machine to measure a volume distribution of cut pieces, a volume of the cut pieces can be adjusted to a preferable size. Further, the cut pieces are passed through a filter, and a cut piece having a certain particle size or less is collected. The cut piece that does not pass through the filter is supplied again to the cutting machine for cutting. By adjusting an opening area of the filter in this way, preferable cut pieces can be obtained as an aggregate.

Nylon 6 resin A1030 manufactured by Unitika Ltd. was additionally charged into the aggregate of the obtained cut pieces to obtain a Y material precursor. The Y material precursor is heated and the thermoplastic resin is melted, and kneaded to prepare a kneaded product, which is used as the Y material immediately before being charged into a press molding mold.

The weight average fiber length $Lw_B$ of the carbon fiber contained in the Y material was measured to be 0.3 mm. The fiber volume fraction of the Y material ($Vf_Y$) was 10 Vol %.

The Y material precursor supplied from a supply port of a melt-kneader is uniformly melted by a heating and melting action from the outside in a heating cylinder, a shear heat generation of a material itself, and a kneading action accompanying rotation of a screw body. A resin is kneaded by a shear flow. Since the remaining offcut cut out of the X material is used as the raw material of the Y material, the carbon fiber is already impregnated with the thermoplastic resin. Therefore, a degree of breakage of the fiber due to a shear force during the shear flow can be reduced, the fiber length of the carbon fiber in an obtained fiber-reinforced thermoplastic resin composite material molded body can be increased, and mechanical properties of the molded body can be improved.

(Preparation of Press-Molded Body)

Figure 7:
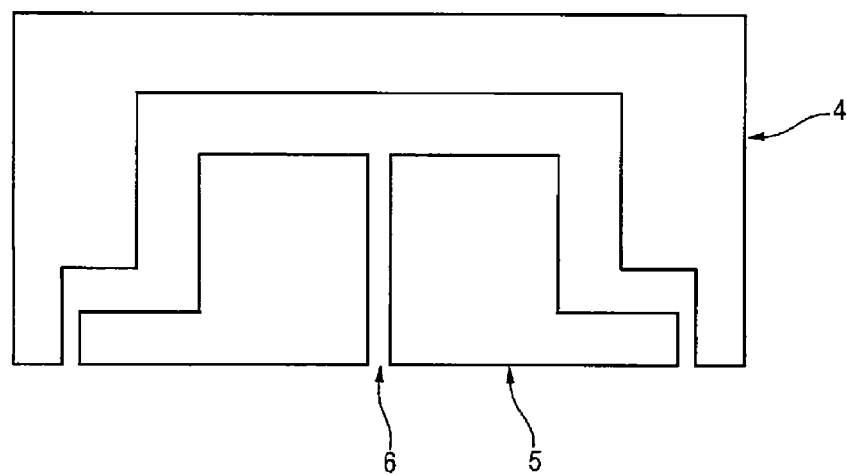
FIG. 7 is a schematic view showing a cross section of an example of a mold.
Figure 8:
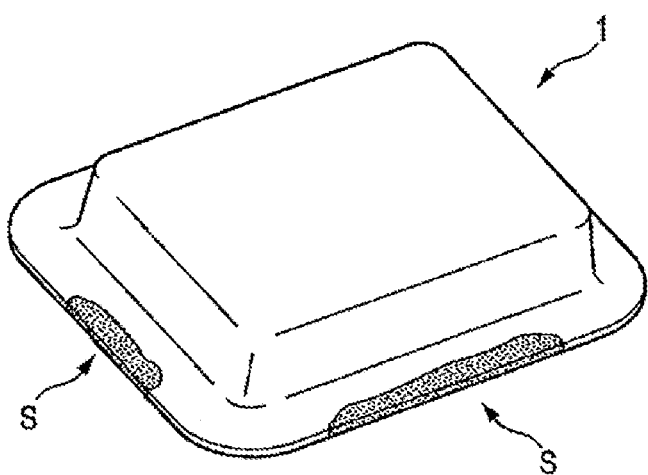
FIG. 8 is a schematic view showing an example of the press-molded body in which a short shot occurs at an end portion.

After the X material was dried in a hot air dryer at 120° C. for 4 hours, a temperature was increased to 290° C. by an infrared heater, and the X material was placed in a mold formed of an upper mold 4 and the lower mold 5 as shown in FIG. 7. As shown in FIG. 7, the lower mold 5 is provided with one gate 6 for injecting the Y material into a central portion of a region serving as a top plane of the press-molded body. A temperature of the mold was 150° C.

After closing the mold and confirming with a pressure gauge that pressure is started to be applied to a part of the X material, the Y material was injected into the mold from the gate 6 (a heating temperature of the Y material was 240° C., and an injection pressure of the Y material was 110 kgf/m², which was about 1078 Pa). Then, the X material and the Y material were simultaneously pressed by pressurizing at a pressing pressure of 5 MPa for 1 minute to manufacture a press-molded body having a shape shown in FIGS. 4A and 4B.

$Q_X:Q_Y$, which is the ratio of the total weight $Q_X$ of the X material to be used to the total weight $Q_Y$ of the Y material to be used, was 73:27.

Results are shown in Table 1.

Examples 2 to 5

A press-molded body was similarly manufactured as in Example 1 except that the pressing pressure, the heating temperature of the Y material and the injection pressure of the Y material at the time of injection were changed as shown in Table 1 below.

Comparative Example 1

A raw material substrate was similarly manufactured as in Example 1.

Figure 6:
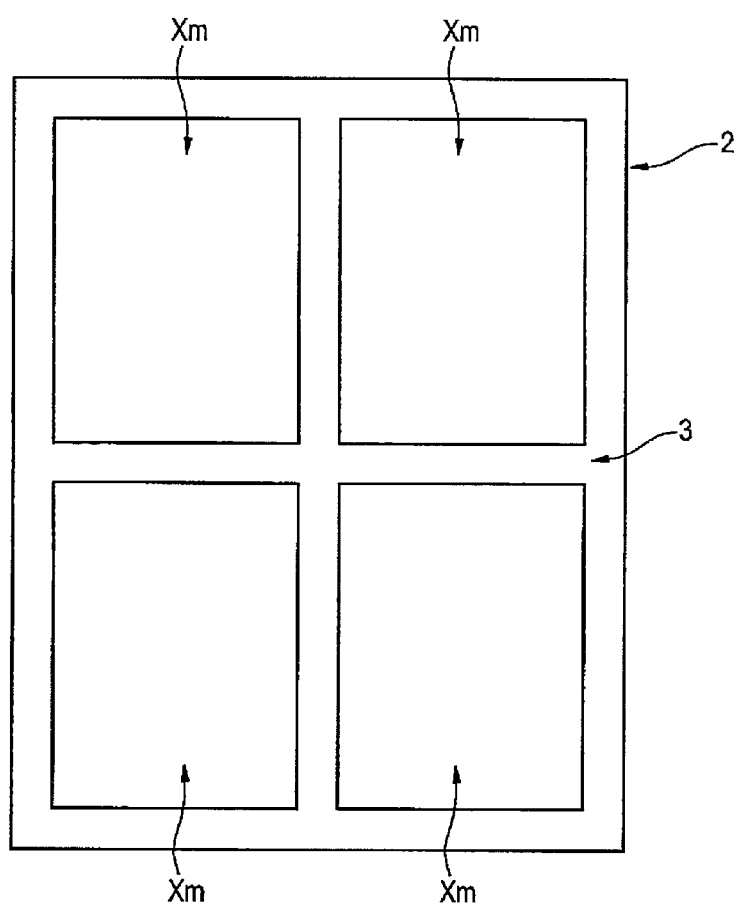
FIG. 6 is a schematic view showing how the X material is cut out from the raw material substrate.

An X material (Xm in FIG. 6) was prepared by cutting a plate-shaped raw material substrate as shown in FIG. 6 (all of cut-out X materials have same shape). The X material (Xm in FIG. 6) had a plate shape having a length of 480 mm and a width of 360 mm. A press-molded body was similarly manufactured as in Example 1 except that the X material was used and the Y material was not used.

In the press-molded bodies manufactured in Examples 1 to 5, a proportion of the Y region made of the Y material increased toward at least one end portion in an in-plane direction, and at least one end portion in an in-plane direction was formed of only the Y region made of the Y material.

composite material as a raw material can be reduced, and the number of molding materials that can be cut out from one composite material can be increased.

In Examples 1 to 5, the Y material is used in addition to the X material, and the pressing pressure can be more uniformly applied than in Comparative Example 1 using only the X material.

In Comparative Example 1, since a rectangular molding material was used as it was without pattern-cutting, weights of four corner portions became heavy (an extra thick portion occurred) when the molded body was formed. Since an extra thick portion occurred in the molded body, another molding material for press molding or Y material could not be prepared as in Example.

Reference Example and Reference Comparative Example

Following reference experiments were carried out in order to verify a point that "when the press-molded body having the top plane portion and the standing plane portion is manufactured, the injection molding material can be caused to flow from the cavity region other than the cavity region for forming the standing plane portion to the cavity region for forming the standing plane portion", which is a further effect in the present invention.

(Springback Amount)

The molding material was cut into 100 mm×100 mm and two pieces thereof were overlapped, a thermocouple was

TABLE 1

|  | Example 1 | Example 2 | Example 3 | Example 4 | Example 5 | Comparative Example 1 |
|---|---|---|---|---|---|---|
| X material |  |  |  |  |  |  |
| Weight average fiber length $L_{W_A}$ of carbon fiber A | 20 mm | 20 mm | 20 mm | 20 mm | 20 mm | 20 mm |
| Thermoplastic resin $R_X$ | PA6 | PA6 | PA6 | PA6 | PA6 | PA6 |
| Fiber volume fraction $Vf_X$ | 35% | 35% | 35% | 35% | 35% |  |
| Weight fraction $Q_X$ | 0.73 | 0.73 | 0.73 | 0.73 | 0.73 | 1 |
| Y material |  |  |  |  |  |  |
| Weight average fiber length $L_{W_B}$ of carbon fiber B | 0.2 mm | 0.3 mm | 0.3 mm | 0.3 mm | 0.3 mm | — |
| Thermoplastic resin $R_Y$ | PA6 | PA6 | PA6 | PA6 | PA6 | — |
| Fiber volume fraction $Vf_Y$ | 10 Vol % | 10 Vol % | 10 Vol % | 10 Vol % | 10 Vol % | — |
| Weight fraction $Q_Y$ | 0.27 | 0.27 | 0.27 | 0.27 | 0.27 | 0 |
| Shape of molded body | FIGS. 4A and 4B | FIGS. 4A and 4B | FIGS. 4A and 4B | FIGS. 4A and 4B | FIGS. 4A and 4B | FIGS. 4A and 4B |
| Pattern cut shape | FIG. 5 | FIG. 5 | FIG. 5 | FIG. 5 | FIG. 5 | FIG. 6 |
| Molding condition |  |  |  |  |  |  |
| Pressing pressure MPa | 5 | 20 | 20 | 20 | 20 | 20 |
| Temperature of mold ° C. | 150 | 150 | 150 | 150 | 150 | 150 |
| heating temperature of X material ° C. | 290 | 290 | 290 | 290 | 290 | 290 |
| heating temperature of Y material ° C. | 240 | 240 | 290 | 240 | 290 |  |
| injection pressure of Y material kgf/m² | 110 | 55 | 55 | 110 | 110 |  |
| Short shot | Good | Great | Great | Excellent | Perfect | Bad |

A result of the short shot was Good or higher in Examples 1 to 5, but was Bad in Comparative Example 1 in which the Y material was not used.

In Examples 1 to 5, the X material (Xm in FIG. 5) is prepared by being cut from the plate-shaped raw material substrate 2 as shown in FIG. 5, and another molding material (X material) for the press molding can be prepared using an offcut 3 occurred at that time, or the Y material can also be prepared using the offcut 3. Therefore, the loss of the inserted in a central portion of a mating surface, the pieces were charged into a preheating furnace heated to a heater temperature of 340° C., heating was performed until a thermocouple temperature was 275° C. When the thermocouple temperature was 275° C., the pieces were taken out from the furnace, cooled and solidified, and a preheated thickness was measured. The springback amount is a ratio of the preheated thickness to the thickness before preheating, and is expressed by the following equation.

Springback amount=preheated thickness $t_{X1}$(mm)/
thickness $t_{X0}$(mm)before preheating Reference Example 1

(Manufacturing of Raw Material Substrate)

A carbon fiber "Tenax" (registered trademark) STS40-24K (average fiber diameter: 7 μm, number of single fibers: 24,000) manufactured by TEUIN LIMITED and cut to a fiber length of 20 mm was used as the carbon fiber, and nylon 6 resin A1030 manufactured by Unitika Ltd. was used as the resin. Based on a method described in U.S. Pat. No. 8,946,342, a composite material of the carbon fiber and the nylon 6 resin was prepared, in which carbon fibers were randomly oriented in two dimensions. The obtained composite material was heated at 2.0 MPa for 5 minutes in a press device heated to 260° C. to obtain a plate-shaped raw material substrate (composite material M) having an average thickness of 1.4 mm. When the carbon fibers contained in the plate-shaped raw material substrate were analyzed, the carbon fiber volume fraction (Vf) was 35 Vol %, the fiber length of the carbon fibers was constant, and the weight average fiber length was 20 mm.

(Preparation of X Material)

The X material was prepared by pattern cutting from a plate-shaped raw material substrate. The weight average fiber length $Lw_A$ of the carbon fiber contained in the X material was 20 mm, and the fiber volume fraction ($Vf_X$) of the X material was 35 Vol %.

(Manufacturing of Y Material)

The Y material was prepared from an offcut occurred after the X material was prepared. Specifically, the offcut is supplied to a commercially available cutting machine and is cut. By appropriately changing a cutting blade size, a cutting blade interval, a pulverization time, and a rotation speed of the cutting machine to measure a volume distribution of cut pieces, a volume of the cut pieces can be adjusted to a preferable size. Further, the cut pieces are passed through a filter, and a cut piece having a certain particle size or less is collected. The cut piece that does not pass through the filter is supplied again to the cutting machine for cutting. By adjusting an opening area of the filter in this way, preferable cut pieces can be obtained as an aggregate.

Nylon 6 resin A1030 manufactured by Unitika Ltd. was additionally charged into the aggregate of the obtained cut pieces to obtain a Y material precursor. The Y material precursor is heated and the thermoplastic resin is melted, and kneaded to prepare a kneaded product which is used as the Y material immediately before being charged into a press molding mold.

The weight average fiber length $Lw_B$ of the carbon fiber contained in the Y material was measured to be 0.3 mm. The fiber volume fraction of the Y material ($Vf_Y$) was 10 Vol %.

The Y material precursor supplied from a supply port of a melt-kneader is uniformly melted by a heating and melting action from the outside in a heating cylinder, a shear heat generation of a material itself, and a kneading action accompanying rotation of a screw body. A resin is kneaded by a shear flow. Since the remaining offcut cut out of the X material is used as the raw material of the Y material, the carbon fiber is already impregnated with the thermoplastic resin. Therefore, a degree of breakage of the fiber due to a shear force during the shear flow can be reduced, the fiber length of the carbon fiber in an obtained fiber-reinforced thermoplastic resin composite material molded body can be increased, and mechanical properties of the molded body can be improved.

(Preparation of Press-Molded Body)

After the X material was dried in a hot air dryer at 120° C. for 4 hours, a temperature was increased to 290° C. by an infrared heater, and the X material was placed in a mold formed of the upper mold 4 and the lower mold 5 as shown in FIG. 12. As shown in FIG. 12, the lower mold 5 is provided with one gate 6 for injecting the Y material into the central portion of the cavity region in which the top plane of the press-molded body (the center of the top plane portion of the molded body; 201 in FIG. 13). A temperature of the mold was 150° C.

A mold cavity was designed such that the thickness t1 of the standing plane portion of the molded body was 3.0 mm and the thickness t2 of the top plane portion was 2.0 mm.

After closing the mold and confirming with a pressure gauge that pressure is started to be applied to a part of the X material, the Y material was injected into the mold from the gate 6 (a heating temperature of the Y material was 240° C., and an injection pressure of the Y material was 110 kgf/m$^2$, which was about 1078 Pa). Then, the X material and the Y material were simultaneously pressed by pressurizing at a pressing pressure of 5 MPa for 1 minute to manufacture a press-molded body having a shape shown in FIGS. 4A and 4B. $Q_X$:$Q_Y$, which is the ratio of the total weight $Q_X$ of the X material to be used to the total weight $Q_Y$ of the Y material to be used, was 73:27.

The thickness t1 of the standing plane portion of the obtained molded body, a thickness tx of the X region in the standing plane portion, a thickness ty of the Y region in the standing plane portion, and the thickness t2 of the top plane portion were measured. Results are shown in Table 2.

Reference Comparative Example 1

A mold cavity was designed such that the thickness t1 of the standing plane portion of the molded body was 2.0 mm and the thickness t2 of the top plane portion was 2.0 mm.

Press molding was similarly performed as in Example 1 except that $Q_X$:$Q_Y$, which is the ratio of the total weight $Q_X$ of the X material to be used and the total weight $Q_Y$ of the Y material to be used, was set to 69:31, and a molded body was obtained. Since a thickness of the standing plane of the molded body to be obtained was thinner than that of Example 1, a thickness of the mold cavity region was reduced.

TABLE 2

|  |  | Reference Example 1 | Reference Comparative Example 1 |
|---|---|---|---|
| Material | X material |  |  |
|  | Plate thickness | 1.4 mm | 1.4 mm |
|  | Weight average fiber length $Lw_A$ carbon fiber A | 20 mm | 20 mm |
|  | Thermoplastic resin $R_X$ | PA6 | PA6 |
|  | Fiber volume fraction $Vf_X$ | 35 Vol % | 35 Vol % |

TABLE 2-continued

Figure 13:
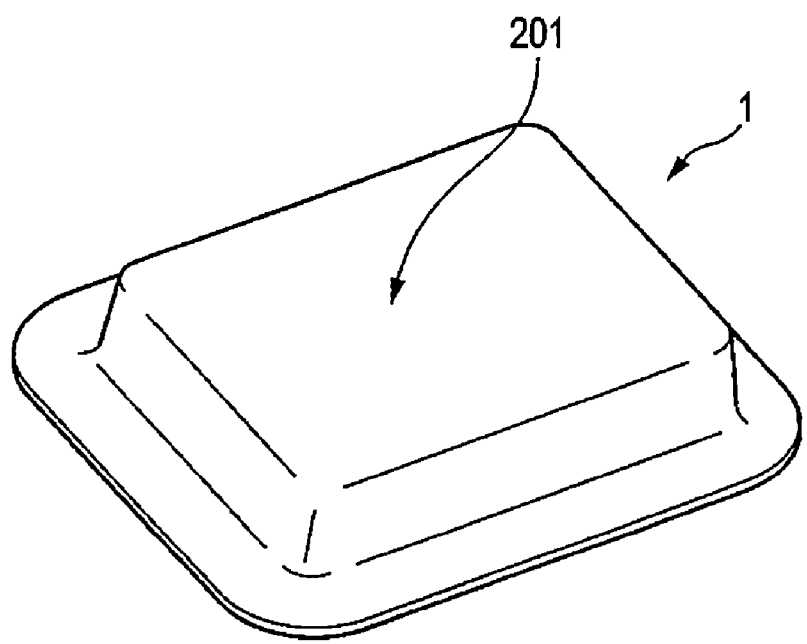
FIG. 13 is a schematic view showing a position where a gate for injection is provided.

|  |  | Reference Example 1 | Reference Comparative Example 1 |
|---|---|---|---|
|  | Weight fraction $Q_X$ | 0.73 | 0.69 |
|  | Springback amount | 1.7 | 1.7 |
|  | Plate thickness $t_{x1}$ of X material with springback | 2.38 mm | 2.38 mm |
| Y material | | | |
|  | Weight average fiber length $Lw_B$ carbon fiber B | 0.3 mm | 0.3 mm |
|  | Thermoplastic resin $R_Y$ | PA6 | PA6 |
|  | Fiber volume fraction $Vf_Y$ | 10 Vol % | 10 Vol % |
|  | Weight fraction $Q_Y$ | 0.27 | 0.31 |
| Molding method | Mold and position of injection gate | 201 in FIG. 13 | 201 in FIG. 13 |
| Mold | Thickness T1 of cavity region for forming standing plane portion | 3.0 mm | 2.0 mm |
|  | Thickness T2 of cavity region for forming top plane portion | 2.0 mm | 2.0 mm |
| Molded body | Thickness t1 of standing plane | 3.0 mm | 2.0 mm |
|  | Thickness tx of X material in standing plane | 1.4 mm | 1.4 mm |
|  | Thickness ty of Y material in standing plane | 1.6 mm | 0.6 mm |
|  | tx/t1 | 0.47 | 0.7 |
|  | Thickness t2 of top plane | 2.0 mm | 2.0 mm |
|  | Shape of molded body | FIGs. 4A and 4B | FIGs. 4A and 4B |

REFERENCE SIGNS LIST 1 press-molded body
X X region
Y Y region
F flange portion
XY transition section XY
Xm X material
2 raw material substrate (composite material M)
3 offcut
4 upper mold
5 lower mold
6 gate
S short shot
7 top plane portion
8 standing plane portion
9 cavity region for forming flange portion
10 cavity region for forming top plane portion
11 cavity region for forming standing plane portion
t1 thickness of standing plane portion
t2 thickness of top plane portion
201 position of injection gate
T1 thickness of cavity region for forming standing plane portion
T2 thickness of cavity region for forming top plane portion
$t_{x0}$ thickness of X material before heating
$t_{x1}$ thickness of heated X material with springback
1601 top plane portion prepared by being dragged by upper mold
1001 rib (made of Y material)

The invention claimed is:

1. A method of manufacturing a press-molded body, comprising:
 a step of placing an X material having a plate shape in a mold;
 a step of closing the mold, starting applying pressure to a part of the X material, and then injecting a Y material, which is a kneaded material, into the mold; and
 a step of cold pressing the X material and the Y material in the mold to integrally mold the X material and the Y material, wherein the Y material flows and extends in an in-plane direction of the X material to manufacture the press-molded body,
 wherein the X material is cut out from a composite material M containing a reinforcing fiber FA having a weight average fiber length $Lw_A$ and a thermoplastic resin $R_X$,
 the Y material contains a reinforcing fiber FB having a weight average fiber length $Lw_B$ and a thermoplastic resin $R_Y$, wherein
 $Lw_B < Lw_A$, and
 $Lw_A$ is 1 mm or more and 100 mm or less,
 wherein the reinforcing fiber FA is a carbon fiber A having a weight average fiber length $Lw_A$ or a glass fiber GA having a weight average fiber length $Lw_A$, and the reinforcing fiber FB is a carbon fiber B having a weight average fiber length $Lw_B$ or a glass fiber GB having a weight average fiber length $Lw_B$,
 wherein at least one end portion in an in-plane direction of the press-molded body is formed of only a Y region made of the Y material.

2. The method of manufacturing a press-molded body according to claim 1, wherein
 the Y material is obtained by using an offcut as a raw material, the offcut remained after cutting out the X material from the composite material M.

3. The method of manufacturing a press-molded body according to claim 1, wherein the X material is cut out by pattern-cutting from the composite material M.

4. The method of manufacturing a press-molded body according to claim 1, wherein
 a ratio $Q_X:Q_Y$ of a total weight $Q_X$ of the X material to be used to a total weight $Q_Y$ of the Y material to be used is 99:1 to 50:50, and
 a proportion of a Y region made of the Y material increases toward at least one end portion in an in-plane direction of the press-molded body.

5. The method of manufacturing a press-molded body according to claim 1, wherein
 the press-molded body has a transition section XY in which an X region made of the X material and a Y region made of the Y material are stacked, and the end portion in the in-plane direction formed of only the Y region is continuously formed with the Y region of the transition section XY.

6. The method of manufacturing a press-molded body according to claim 1, wherein a volume $V_X$ of the X material to be used and a volume $V_Y$ of the Y material to be used satisfy a relationship of $V_X \geq V_Y$.

7. The method of manufacturing a press-molded body according to claim 1, wherein the weight average fiber length $Lw_B$ is 1.0 mm or less.

8. The method of manufacturing a press-molded body according to claim 1, wherein a shape of the X material is a shape developed by an inverse molding analysis in a computer from a three-dimensional shape of the press-molded body.

9. The method of manufacturing a press-molded body according to claim 1, wherein the press-molded body has a flange portion, and at least one end portion of the flange portion is formed of only the Y region made of the Y material.

10. The method of manufacturing a press-molded body according to claim 1, wherein the press-molded body includes a portion having a hat-shaped cross section.

11. The method of manufacturing a press-molded body according to claim 1, wherein a relationship between a fiber volume fraction $Vf_X$ of the X material and a fiber volume fraction $Vf_Y$ of the Y material satisfy $Vf_X \geq Vf_Y$.

12. The method of manufacturing a press-molded body according to claim 1, wherein the Y material is obtained by crushing an offcut as a raw material, the offcut remained after cutting out the X material from the composite material.

13. The method of manufacturing a press-molded body according to claim 12, wherein the press-molded body has a flange portion, and at least one end portion of the flange portion is formed of only the Y region made of the Y material.

14. The method of manufacturing a press-molded body according to claim 1, wherein
a springback amount of the X material is more than 1.0 and less than 14.0,
the press-molded body has a standing plane portion and a top plane portion,
a thickness t1 of the standing plane portion and a thickness t2 of the top plane portion satisfy t1>t2, and
in the cold pressing, the Y material is caused to flow from a cavity region other than a cavity region for forming the standing plane portion to a cavity region for forming the standing plane portion and press-molded.

15. The method of manufacturing a press-molded body according to claim 14, wherein which the mold has a cavity in which a thickness T1 of a cavity region for forming the standing plane portion and a thickness T2 of a cavity region for forming the top plane portion are T1>T2.

16. The method of manufacturing a press-molded body according to claim 15, wherein which the thickness T1 of the cavity region for forming the standing plane portion and a plate thickness $tx_1$ of a X material with springback satisfy $T1 > T_{x1}$.

17. A method of manufacturing a press-molded body, comprising:
a step of placing an X material having a plate shape in a mold;
a step of closing the mold, starting applying pressure to a part of the X material, and then injecting a Y material, which is a kneaded material, into the mold; and
a step of cold pressing the X material and the Y material in the mold to integrally mold the X material and the Y material, wherein the Y material flows and extends in an in-plane direction of the X material to manufacture the press-molded body,
wherein the X material is cut out from a composite material M containing a carbon fiber A having a weight average fiber length $Lw_A$ and a thermoplastic resin $R_X$,
the Y material contains a carbon fiber B having a weight average fiber length $Lw_B$ and a thermoplastic resin $R_Y$,
wherein
$Lw_B < Lw_A$, and
$Lw_A$ is 1 mm or more and 100 mm or less,
wherein at least one end portion in the in-plane direction of the press-molded body is formed of only a Y region made of the Y material.

18. The method of manufacturing a press-molded body according to claim 17, wherein
the Y material is obtained by using an offcut as a raw material, the offcut remained after cutting out the X material from the composite material M.

19. The method of manufacturing a press-molded body according to claim 17, wherein the X material is cut out by pattern-cutting from the composite material M.

20. The method of manufacturing a press-molded body according to claim 17, wherein
a ratio $Q_X:Q_Y$ of a total weight $Q_X$ of the X material to be used to a total weight $Q_Y$ of the Y material to be used is 99:1 to 50:50, and
a proportion of a Y region made of the Y material increases toward at least one end portion in an in-plane direction of the press-molded body.

21. The method of manufacturing a press-molded body according to claim 17, wherein
the press-molded body has a transition section XY in which an X region made of the X material and a Y region made of the Y material are stacked, and
the end portion in the in-plane direction formed of only the Y region is continuously formed with the Y region of the transition section XY.

22. The method of manufacturing a press-molded body according to claim 17, wherein a volume $V_X$ of the X material to be used and a volume $V_Y$ of the Y material to be used satisfy a relationship of $V_X \geq V_Y$.

23. The method of manufacturing a press-molded body according to claim 17, wherein the weight average fiber length $Lw_B$ is 1.0 mm or less.

24. The method of manufacturing a press-molded body according to claim 17, wherein a shape of the X material is a shape developed by an inverse molding analysis in a computer from a three-dimensional shape of the press-molded body.

25. The method of manufacturing a press-molded body according to claim 17, wherein the press-molded body has a flange portion, and at least one end portion of the flange portion is formed of only the Y region made of the Y material.

26. The method of manufacturing a press-molded body according to claim 17, wherein the press-molded body includes a portion having a hat-shaped cross section.

27. The method of manufacturing a press-molded body according to claim 17, wherein a relationship between a fiber volume fraction $Vf_X$ of the X material and a fiber volume fraction $Vf_Y$ of the Y material satisfy $Vf_X \geq Vf_Y$.

28. The method of manufacturing a press-molded body according to claim 17, wherein the Y material is obtained by crushing an offcut as a raw material, the offcut remained after cutting out the X material from the composite material.

29. The method of manufacturing a press-molded body according to claim 28, wherein the press-molded body has a flange portion, and at least one end portion of the flange portion is formed of only the Y region made of the Y material.

30. The method of manufacturing a press-molded body according to claim 17, wherein
 a springback amount of the X material is more than 1.0 and less than 14.0,
 the press-molded body has a standing plane portion and a top plane portion,
 a thickness t1 of the standing plane portion and a thickness t2 of the top plane portion satisfy t1>t2, and
 in the cold pressing, the Y material is caused to flow from a cavity region other than a cavity region for forming the standing plane portion to a cavity region for forming the standing plane portion and press-molded.

31. The method of manufacturing a press-molded body according to claim 30, wherein which the mold has a cavity in which a thickness T1 of a cavity region for forming the standing plane portion and a thickness T2 of a cavity region for forming the top plane portion are T1>T2.

32. The method of manufacturing a press-molded body according to claim 31, wherein which the thickness T1 of the cavity region for forming the standing plane portion and a plate thickness $tx_1$ of a X material with springback satisfy $T1 > T_{x1}$.

* * * * *